(12) United States Patent
Nakayama et al.

(10) Patent No.: US 7,167,764 B2
(45) Date of Patent: Jan. 23, 2007

(54) DIGITAL MIXER AND CONTROL METHOD FOR DIGITAL MIXER

(75) Inventors: Kei Nakayama, Hamamatsu (JP);
Kotaro Terada, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 726 days.

(21) Appl. No.: 10/623,367

(22) Filed: Jul. 18, 2003

(65) Prior Publication Data
US 2004/0133291 A1 Jul. 8, 2004

(30) Foreign Application Priority Data
Jul. 18, 2002 (JP) .............................. 2002-210310

(51) Int. Cl.
*H04M 7/00* (2006.01)
(52) U.S. Cl. ........................................ 700/94; 381/119
(58) Field of Classification Search ................. 381/119
See application file for complete search history.

(56) References Cited

U.S. PATENT DOCUMENTS 4,993,073 A * 2/1991 Sparkes ..................... 381/119
2002/0082732 A1 6/2002 Suyama et al.

FOREIGN PATENT DOCUMENTS

JP 2000-293180 10/2000

* cited by examiner

*Primary Examiner*—Daniel Swerdlow
(74) *Attorney, Agent, or Firm*—Morrison & Foerster LLP

(57) ABSTRACT

There is provided a digital mixer including a plurality of functional blocks each having a CPU and a control program executed by the CPU which is capable of properly and easily controlling the version of the control program operated by the CPU of each functional block. When the power of the digital mixer is turned on, the respective versions of the functional blocks are acquired. Matching of the acquired versions of the functional blocks with the reference version is checked. When the checked versions of the functional blocks all match the reference version, the operation of the digital mixer is continued, and when at least one of the checked versions of the functional blocks mismatches the reference version, a warning is given to the user.

23 Claims, 13 Drawing Sheets

WHEN MISMATCH IS NOT FATAL

801 — Some components not responding ! Ignore it and continue ?  [OK]

802 — Some components not consistent ! Ignore it and continue ?  [OK]

WHEN MISMATCH IS FATAL

803 — Component not responding ! Disabled

804 — Component not consistent ! Disabled

DIGITAL MIXER AND CONTROL METHOD FOR DIGITAL MIXER

BACKGROUND OF THE INVENTION

1. Field of the Invention

The present invention relates to a digital mixer that is provided with a plurality of control programs for providing centralized control of acoustic equipment, and a method of controlling such a digital mixer, and more particularly to a digital mixer that controls the respective versions of the control programs and a method of controlling such a digital mixer.

2. Description of the Related Art

Conventionally, there have been proposed digital mixers for controlling acoustic equipment installed in a hall where concerts or plays are given. Such acoustic equipment includes a large number of microphones and a large number of loudspeakers, and uses various sound effects and the like. The digital mixer controls in a centralized manner a mixing process for mixing a number of input signals, an effect applying process for applying effects to the mixed signal, and a selection process for selecting an output system from a plurality of output systems, to output the signal having the effects applied thereto.

A digital mixer of the above type has been disclosed e.g. by Japanese Laid-Open Patent Publication (Kokai) No. 2000-293180, in which a console and an engine are separated from each other with the console disposed on an operator side and the engine on a player side, and connected to each other by cables. The mixer of this type has a large amount of processing to be executed, and therefore hardware and software provided for the digital mixer are divided into a plurality of functional blocks according to the processes to be executed. The functional blocks are each controlled by one or more CPU's, and cooperate with each other to achieve the overall operation of the digital mixer. A control program (so-called firmware) executed by the CPU or CPU's for each functional block is stored on a predetermined storage area provided for the functional block. The respective versions of the control programs for the functional blocks are controlled, and can be upgraded.

Further, Japanese Patent Application No. 2000-396105 has proposed a system for a console-and-engine separation type digital mixer, in which a PC (personal computer) is connected to either a console or an engine of the mixer, to execute an upgrade program for upgrading control programs, and the console checks the respective versions of devices, as a master.

The above upgrade method employed by the console-and-engine separation type digital mixer makes it possible to simultaneously upgrade the control programs for all functional blocks included in devices currently connected to the digital mixer, by one-time upgrade operation.

However, even if this upgrade method is employed, a case can occur where versions of some functional blocks of the mixer do not match those of the other functional blocks. For example, the versions of programs for functional blocks of a device which is not connected to the digital mixer when the upgrade operation is executed are not upgraded. Therefore, when the device is connected to the digital mixer after the execution of the upgrade operation, a mismatch can occur between the versions of the programs for the functional blocks of the device and those of the functional blocks of the other devices. Similarly, when a failure of a functional block provided on a board is detected, if the board is replaced with a new board, a mismatch can occur between the version of the control program for the functional block provided on the new board and those of the control programs for the other functional blocks. If the digital mixer is operated with a mismatch in versions of control programs therefor, malfunction of the digital mixer can be caused, and in the worst case, the device connected to the digital mixer can be broken.

Further, when at least one of a plurality of functional blocks of the control system provided for the digital mixer fails, the operation of the digital mixer stops. In other words, unless all the functional blocks of the control system normally operate, the overall operation of the digital mixer cannot be normally performed.

SUMMARY OF THE INVENTION

It is an object of the present invention to provide a digital mixer including a plurality of functional blocks each having a CPU and storing a control program executed by the CPU, and a method of controlling the digital mixer, which are capable of properly and easily controlling the version of the control program operated by the CPU of each functional block.

To attain the above object, in a first aspect of the present invention, there is provided a digital mixer that includes a plurality of functional blocks and operates as a mixer by cooperation of the plurality of functional blocks, comprising an acquisition device that acquires versions of the functional blocks when power of the digital mixer is turned on, a checking device that checks matching of the acquired versions of the functional blocks with a reference version, and a controller that causes the digital mixer to continue operation thereof when the checked versions of the functional blocks all match the reference version, and causes a warning to be given to a user when at least one of the checked versions of the functional blocks mismatches the reference version.

With the above arrangement according to the first aspect of the present invention, when the power of the digital mixer is turned on, the respective matching states of the versions of all the functional blocks are checked, and then, when there is no version mismatch, the operation of the digital mixer is continued, and when there is a version mismatch, a warning is given to the user. Therefore, the user can notice any version mismatch immediately after the power is turned on, and properly and easily manage the respective versions of the control programs operated by the CPU's of the functional blocks.

Preferably, a version of at least one of the plurality of functional blocks is set to a reference version for the plurality of functional blocks.

Preferably, the digital mixer further comprises a determination device operable when the at least one of the checked versions of the functional blocks mismatches the reference version, for determining whether or not the mismatch is fatal to an overall operation of the digital mixer, and a controller operable when the mismatch is fatal to the overall operation of the digital mixer, for causing the digital mixer to stop operation thereof, and when the mismatch is not fatal to the overall operation of the digital mixer, for issuing a notification that the operation of the digital mixer will be continued by ignoring the mismatch, and causing the digital mixer to continue operation thereof by disconnecting a functional block determined to mismatch, from the plurality of functional blocks.

With the above preferable arrangement, when at least one of the checked respective versions of the functional blocks mismatches the reference version, if the mismatch is fatal to the overall operation of the digital mixer, the operation of the digital mixer is stopped, while if the mismatch is not fatal to the overall operation of the digital mixer, the user is notified that the operation of the digital mixer will be continued by ignoring the mismatch, and the operation is continued by disconnecting the functional block having the version determined to mismatch, from the plurality of functional blocks. Therefore, in the latter case, the operation of the digital mixer can be continued, insofar as the user desires the operation of the mixer to be continued even though it may be the minimum operation.

Preferably, the digital mixer further comprises a version acquisition and checking device operable when at least one new functional block is connected to the plurality of functional blocks, for acquiring a version of the at least one new functional block connected to the plurality of functional blocks, and checking matching of the acquired version with the reference version, a determination device operable when there is a mismatch between the checked version and the reference version, for determining whether or not the mismatch is fatal to an overall operation of the digital mixer, and a controller operable when the mismatch is fatal to the overall operation of the digital mixer, for causing the digital mixer to stop operation thereof, and when the mismatch is not fatal to the overall operation of the digital mixer, for issuing a notification that the operation of the digital mixer will be continued by ignoring the mismatch, and causing the digital mixer to continue operation thereof by disconnecting a functional block determined to mismatch, from the plurality of functional blocks.

With the above preferable arrangement, even when at least one new functional block is connected to the plurality of functional blocks, insofar as no version mismatch fatal to the overall operation of the digital mixer has not occurred, the digital mixer continues its operation in the partially operative state, which is convenient to the user, when he desires the operation of the digital mixer to be continued even though the operation may be limited.

Preferably, the digital mixer further comprises an abnormality detecting device that detects abnormality of the plurality of functional blocks, a determination device operable when abnormality is detected in at least one of the plurality of functional blocks, for determining whether or not the abnormality is fatal to an overall operation of the digital mixer, and a controller operable when the abnormality is fatal to the overall operation of the digital mixer, for causing the digital mixer to stop operation thereof, and when the abnormality is not fatal to the overall operation of the digital mixer, for issuing a notification that the operation of the digital mixer will be continued by ignoring the abnormality, and causing the digital mixer to continue operation thereof by disconnecting the functional block determined to be abnormal, from the plurality of functional blocks.

With the above preferable arrangement, even when an abnormality, such as a failure, occurs in a functional block, insofar as no version mismatch fatal to the overall operation of the digital mixer has not occurred, the digital mixer continues its operation in the partially operative state, which is convenient to the user, when he desires the operation of the digital mixer to be continued even though the operation may be limited.

Preferably, the digital mixer further comprises a display that displays results of checking by the checking device.

Preferably, the checking device checks matching of the acquired versions of the functional blocks in at least one of a case where the power of the digital mixer has is turned on, a case where an instruction is input for checking a matching state of a version of at least one of the plurality of functional blocks, a case where at least one new functional block is connected to the plurality of functional blocks, and a case where at least one functional block is disconnected from the plurality of functional blocks.

More preferably, one specific functional block among the plurality of functional blocks includes a plurality of sub functional blocks having respective versions, a version of a specific sub functional block of the plurality of sub functional blocks being set to the reference version, and the checking device checks matching of a version of the specific functional block exclusive of the specific sub functional block with the reference version, the display displaying results of the checking, the version of the specific functional block, and the reference version.

Further preferably, the checking device checks matching of the respective versions of the sub functional blocks other than the specific sub functional block with the reference version, and the display displays the versions of the sub functional blocks other than the specific sub functional block and respective results of the checking thereof.

Further preferably, functional blocks other than the specific functional block include a plurality of sub functional blocks having respective versions, and the checking device checks matching of respective versions of the functional blocks other than the specific functional block with the reference version, the display displaying the versions of the functional blocks other than the specific functional block and respective results of the checking thereof.

Still more preferably, the checking device checks matching of the versions of the plurality of sub functional blocks included in the functional blocks other than the specific functional block with the reference version, and the display displays the respective versions of the sub functional blocks included in the functional blocks other than the specific functional block and respective results of the checking thereof.

Further preferably, the display displays a plurality of sub functional blocks connected to at least one input and at least one output of at least one functional block other than the specific functional block.

Still more preferably, the checking device checks matching of respective versions of the sub functional blocks connected to the at least one input and the at least one output of the at least one functional block other than the specific functional block with the reference version, and the display displays the versions of the sub functional blocks connected to the at least one input and the at least one output of the at least one functional block other than the specific functional block, and results of the checking thereof.

Still more preferably, the at least one input and the at least one output of the at least one functional block other than the specific functional block have a plurality of terminals, and the display displays respective connection states of the terminals.

To attain the above object, in a second aspect of the invention, there is provided a digital mixer that includes a plurality of functional blocks and operates as a mixer by cooperation of the plurality of functional blocks, wherein the functional blocks have CPU's and storage devices that store respective control programs executed by the CPU's, the digital mixer comprising an acquisition device that acquires versions of the control programs of the functional blocks when power of the digital mixer is turned on, a checking device that checks matching of the acquired versions of the control programs with a reference version, and a controller that causes the digital mixer to continue operation thereof when the checked versions of the control programs all match the reference version, and causes a warning to be given to a user when at least one of the checked versions of the control programs mismatches the reference version.

With the above arrangement according to the second aspect of the present invention, when the power of the digital mixer is turned on, the matching states of the respective versions of the control programs stored in all the functional blocks are checked, and then, when there is no version mismatch, the operation of the digital mixer is continued, and when there is a version mismatch, a warning is given to the user. Therefore, the user can notice any version mismatch immediately after the power is turned on, and properly and easily manage the respective versions of the control programs operated by the CPU's of the functional blocks.

Preferably, a version of at least one of the control programs is set to a reference version for the control programs of the plurality of functional blocks.

To attain the above object, in a third aspect of the invention, there is provided a method of controlling a digital mixer that includes a plurality of functional blocks and operates as a mixer by cooperation of the plurality of functional blocks, wherein the functional blocks have respective versions, the method comprising an acquisition step of acquiring the versions of the functional blocks when power of the digital mixer is turned on, a checking step of checking matching of the acquired versions of the functional blocks with a reference version, and a control step of causing the digital mixer to continue operation thereof when the checked versions of the functional blocks all match the reference version, and causing a warning to be given to a user when at least one of the checked versions of the functional blocks mismatches the reference version.

With the above arrangement according to the third aspect of the present invention, when the power of the digital mixer is turned on, the respective matching states of the versions of all the functional blocks are checked, and then, when there is no version mismatch, the operation of the digital mixer is continued, and when there is a version mismatch, a warning is given to the user. Therefore, the user can notice any version mismatch immediately after the power is turned on, and properly and easily manage the respective versions of the control programs operated by the CPU's of the functional blocks.

Preferably, a version of at least one of the plurality of functional blocks is set to a reference version for the plurality of functional blocks.

To attain the above object, in a fourth aspect of the invention, there is provided a method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks, the method comprising an acquisition step of acquiring the versions of the functional blocks when power of the digital mixer is turned on, a detecting step of detecting whether or not at least one new functional block is connected to the plurality of functional blocks, a checking step of checking matching of the acquired versions of the functional blocks and a version of the at least one functional block connection of which has been detected, with the reference version, a determination step of determining, when at least one of the checked versions of the functional blocks mismatches the reference version, whether or not the mismatch is fatal to an overall operation of the digital mixer, and a control step of (1) causing the digital mixer to transit to a normally operative state when the checked versions of the functional blocks all match the reference version, or (2) issuing an instruction for stopping operation of the functional blocks, displaying results of the checking in the checking step, the respective versions of the functional blocks, and a message that the mismatch is fatal to the overall operation of the digital mixer, and causing the digital mixer to transit to an inoperative state, when the mismatch is fatal to the overall operation of the digital mixer, or (3) issuing an instruction for stopping operation of a functional block that mismatches in version, and cutting off communication with the functional block, displaying results of the checking in the checking step, the versions of the functional blocks, and a message that operation will be continued by ignoring the mistake, and causing the digital mixer to transit to a partially operative state, when the mismatch is not fatal to the overall operation of the digital mixer.

With the above arrangement according to the fourth aspect of the present invention, when the power of the digital mixer is turned on, the matching states of the versions of all the functional blocks are checked, and then, when there is no version mismatch, the operation of the digital mixer is continued, and when there is a version mismatch, a warning is given to the user, e.g. by display. Therefore, the user can notice any version mismatch immediately after the power is turned on, and properly and easily manage the respective versions of the control programs operated by the CPU's of the functional blocks. Further, the operation of the digital mixer is continued by disconnecting a functional block having a version thereof determined to mismatch from the plurality of functional blocks, which is convenient to the user, when he desires the operation of the digital mixer to be continued even though the operation may be the minimum operation.

To attain the above object, in a fifth aspect of the invention, there is provided a method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks, the method comprising an acquisition step of acquiring the versions of the functional blocks when power of the digital mixer is turned on, a version acquisition completion-determining step of determining whether or not acquisition of the versions of all the functional blocks has been completed, a timeout-determining step of determining whether or not a predetermined time period has elapsed after version acquisition was started in the acquisition step, an impossible version acquisition-determining step of determining, when it is determined in the timeout-determining step that the predetermined time period has elapsed, that a version of a functional block which could not be acquired in the acquisition step is unobtainable, and a checking step of checking matching of the versions of the functional blocks acquired in the acquisition step with the reference version, when it is determined in the version acquisition completion-determining step that acquisition of the versions of all has been completed, or when it is determined in the timeout-determining step that the predetermined time period has elapsed.

To attain the above object, in a sixth aspect of the invention, there is provided a method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks, the method comprising an acquisition step of acquiring, when at least one new functional block is connected to the plurality of functional blocks, a version of the at least one functional block connected to the plurality of functional blocks, a checking step of checking matching of the acquired version of the at least one functional block connected to the plurality of functional blocks with the reference version, an operation stop-instructing step of issuing, when the checked version of the at least one functional block mismatches the reference version, an instruction for stopping operation of the at least one functional block connected to the plurality of functional blocks, and a display step of displaying the version of the at least one functional block connected to the plurality of functional blocks and results of the checking in the checking step.

With the above arrangement according to the sixth aspect of the present invention, even when at least one new functional block is connected to the plurality of functional blocks, and a version mismatch occurs, insofar as the version mismatch is not fatal to the overall operation of the digital mixer, the digital mixer continues its operation in the partially operative state, which is convenient to the user, when he desires the operation of the digital mixer to be continued even though the operation may be limited.

Preferably, the method comprises a communication cut-off-instructing step of issuing, when the checked version of the at least one functional block connected to the plurality of functional blocks mismatches the reference version, an instruction for cutting off communication with the at least one functional block connected to the plurality of functional blocks.

To attain the above object, in a sixth aspect of the invention, there is provided a method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks, and wherein the digital mixer checks matching of the versions of the plurality of functional blocks with the reference version, and displays results of the checking in a dialog box, the method comprising a notification step of notifying, when disconnection of at least one functional block from the plurality of functional blocks is detected, a user that the at least one functional block has been disconnected from the plurality of functional blocks, a first update step of updating a status of the digital mixer according to a kind of the disconnected functional blocks, a determination step of determining, when disconnection of at least one functional block from the plurality of functional blocks is detected, whether or not the dialog box is being displayed, or whether or not there is a version mismatch of at least one functional block of the plurality of function blocks, a second update step of updating, when it is determined in the determination step that the dialog box is being displayed or that there is a version mismatch, display concerning the disconnected functional block in the dialog box, and a control step of causing the digital mixer to transit to a normally operative state when there is no version mismatch after the update of the display concerning the disconnected functional block in the dialog box, or causing the digital mixer to transit to a partially operative state when there is a version mismatch of at least one functional block of the plurality of function blocks but operation of the digital mixer is possible, or causing the digital mixer to transit to an inoperative state when there is a version mismatch that is fatal to continued overall operation of the digital mixer.

With the above arrangement according to the sixth aspect of the present invention, when at least one functional block is disconnected from the plurality of functional blocks, the matching states of the versions of all the functional blocks are checked, and indications in the dialog box are updated. This makes it possible to properly and easily manage the respective versions of the control programs operated by the CPU's of the functional blocks.

The above and other objects, features, and advantages of the present invention will become more apparent from the following detailed description taken in conjunction with the accompanying drawings.

BRIEF DESCRIPTION OF THE DRAWINGS

FIGS. 10A–10B are flowchart of processing executed by a main CPU of the console shown in FIG. 3 when the power of the digital mixer is turned on;

DETAILED DESCRIPTION OF THE PREFERRED EMBODIMENTS

The present invention will now be described in detail with reference to the drawings showing a preferred embodiment thereof.

Figure 1:
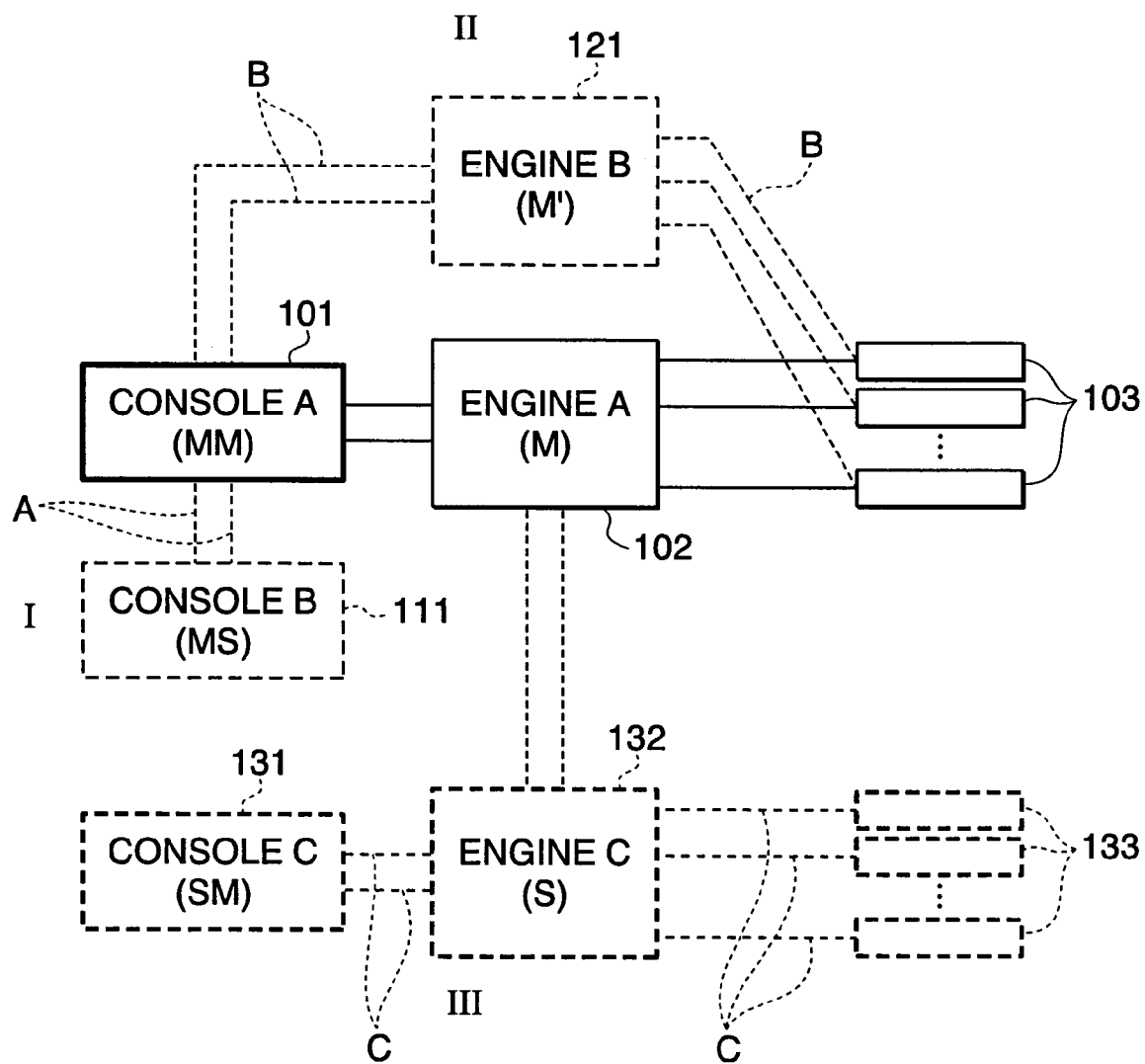
FIG. 1 is a block diagram showing an example of the configuration of a digital mixer according to an embodiment of the present invention.
Figure 5:
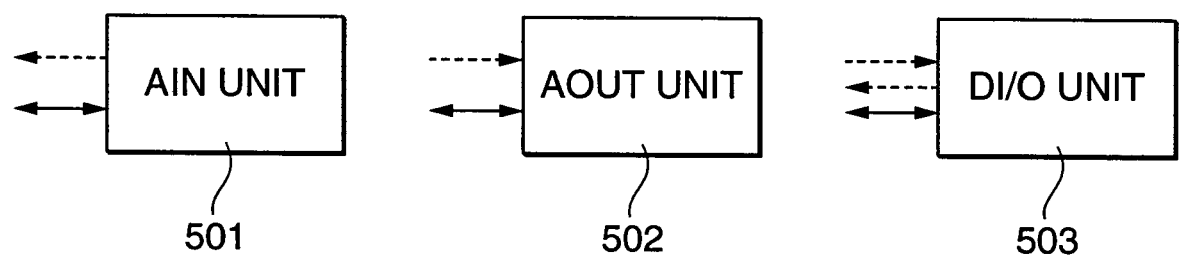
FIG. 5 is a diagram showing specific units forming one group of units in FIG. 1.

Referring first to FIG. 1, there is shown an example of the configuration of a digital mixer according to an embodiment of the invention. Reference numeral 101 designates a console, reference numeral 102 designates an engine, and reference numeral 103 designates three units. The console 101 is provided with a large number of operating elements operated by a user, and a display 206 (see FIG. 2), and issues an instruction to the engine 102 in response to an instruction input operation by the user. Responsive to the instruction from the console 101, the engine 102 mixes, as required, microphone signals, line signals, and so forth input from inputs of the units 103, and performs effect applying processing and other required processing, followed by outputting the resulting signal to the units 103. The units 103 are comprised of an analog input (AIN) unit 501, an analog output (AOUT) unit 502, and a digital input/output (DI/O) unit 503, as shown in FIG. 5, and connected to the engine 102. The AIN unit 501 is comprised of a box in which a plurality of analog/digital (A/D) conversion boards can be mounted. Therefore, the AIN unit 501 is capable of inputting microphone signals and line signals for a plurality of channels. The AOUT unit 502 is comprised of a box in which a plurality of digital/analog (D/A) conversion boards can be mounted. Therefore, the AOUT unit 502 is capable of outputting signals for a plurality of channels. Further, the DI/O unit 503 is comprised of a box in which a plurality of digital input/output (I/O) boards can be mounted. Therefore, the DI/O unit 503 is capable of inputting and outputting digital signals for a plurality of channels.

A single engine 102 is capable of having ten units (AIN units 501 and DI/O units 503) connected to the input side thereof, and six units (AOUT units 502 and DI/O units 503) connected to the output side thereof. A combination of the single console 101, the single engine 102, and the units 103 connected to the engine 102 implements the minimum configuration of the digital mixer as a system. This configuration makes it possible to perform centralized control of processes for sending input signals for any input channels into desired mixing channels, and applying desired effects to the mixed signal, followed by outputting the resulting signals to desired output channels.

Thin broken lines A in FIG. 1 illustrate an example of a digital mixer of a dual-console type formed by connecting another console 111 to the console 101. The dual console type digital mixer has an increased number of operating elements, and therefore even when a large number of channels are provided, a control environment can be constructed which enables direct control of the channels. Further, it is possible to construct a failsafe system which enables the mixing operation to be continued by one console when another console has failed. When the digital mixer is of the dual-console type, the console 101 originally included in the system is designated as a master console, and the console 111 additionally connected to the digital mixer is designated as a slave console. A symbol MM in a box for the console 101 indicates that the console 101 is the master console of a master system, while a symbol MS in a box for the console 111 indicates that the console 111 is the slave console of the master system.

Thin broken lines B in FIG. 1 illustrate an example of a digital mixer formed by mirroring of engines. For engine mirroring, an engine 121 different from the engine 102 is connected between the console 101 of the master system and the units 103. The engines 102 and 121 perform the same operation under the control of the console 101. Normally, a selected engine (e.g. the engine 102) is used, and when the engine fails, the other engine (e.g. the engine 121) is substituted for the selected engine.

Bold broken lines B in FIG. 1 illustrate an example of a digital mixer formed by cascade connection between two systems. The engine 102 and an engine 132 are cascaded to each other, whereby the master system formed by the console 101, the engine 102, and the units 103 is connected to a slave system formed by a console 131, the engine 132, and units 133. As a result, respective mixing buses of the two engines 102, 132 are connected to each other, so that a mixer system having a doubled number of input channels as a whole can be constructed. A symbol SM in a box for the console 131 indicates that the console 131 is the master console of the slave system, and a symbol S in a box for the engine 132 indicates that the engine 132 is an engine of the slave system.

Figure 2:
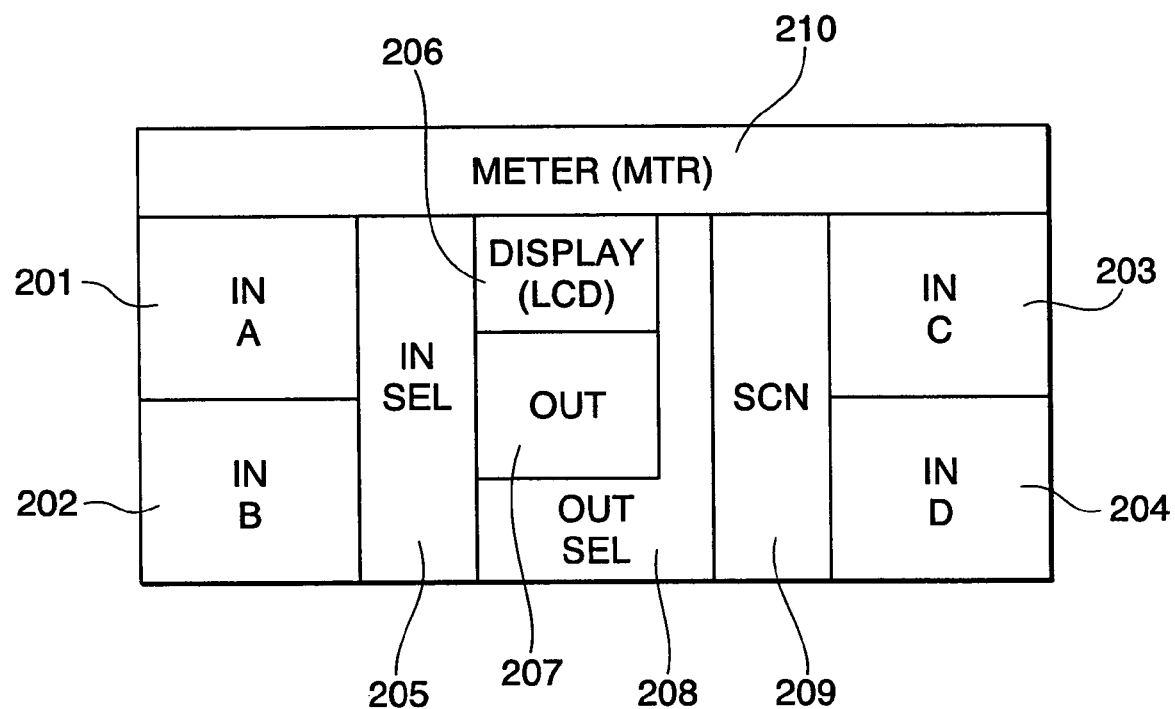
FIG. 2 is a diagram schematically showing the layout of an external panel of one of consoles appearing in FIG. 1.

FIG. 2 is a diagram schematically showing the layout of an external panel of each of the consoles 101 (111, 131). The external panel is divided into ten sections 201 to 210. The sections 201 to 205 and 207 to 209 each include a plurality of operating elements, such as switches, faders, and rotary encoders.

The sections 201 to 204 are single input channel sections (IN A to IN D) that execute various control operations for a plurality of input channels, respectively. The section 205 is a selected input channel section (IN SEL) that executes various control operations for one input channel selected by the input channel sections 201 to 204. The display (LCD) 206 is comprised of a liquid crystal display for displaying various kinds of information, and an interface for a mouse as an operating element. The output channel section 207 executes various control operations for a plurality of output channels. The selected output channel section (OUT SEL) 208 executes various control operations for one output channel selected by the output channel section 207. The scene section (SCN) 209 executes various control operations concerning scenes. "A scene" in this case indicates settings of the digital mixer for a particular scene of operation of the digital mixer. For example, settings of the digital mixer for respective particular cases of operation are stored as "scenes" in advance in a memory, and a desired one of the stored scenes is called, whereby settings of the digital mixer corresponding to the called scene can be easily reproduced. The meter (MTR) 210 includes meters for indicating levels of channels.

Figure 3:
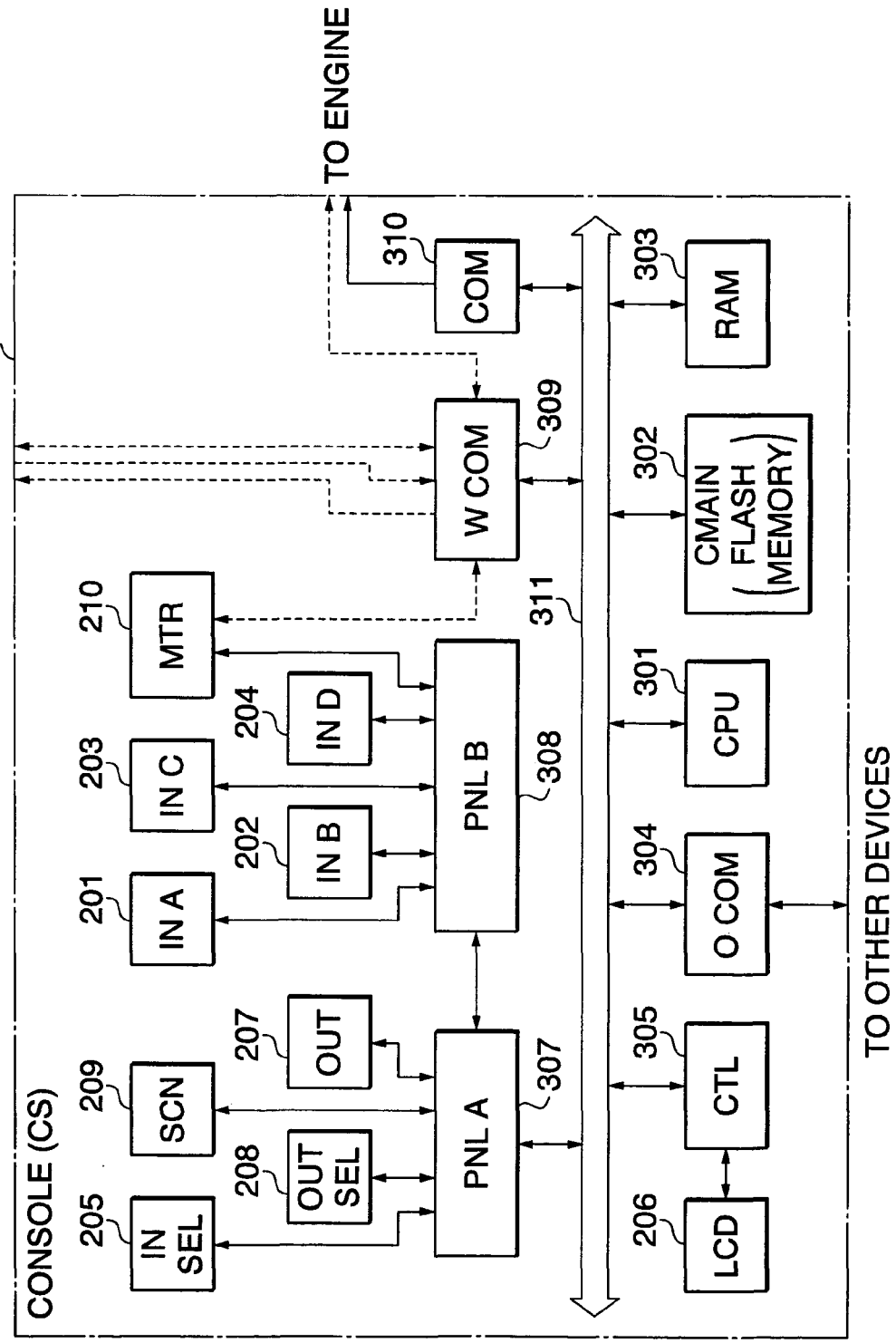
FIG. 3 is a block diagram showing the internal hardware configuration of one of the consoles appearing in FIG. 1.

FIG. 3 is a block diagram showing the internal hardware configuration of each of the consoles 101, 111, 131. The console 101 (111, 131) is comprised of a CPU 301, a flash memory (CMAIN) 302, a random access memory (RAM) 303, a communication controller (O COM) 304, a controller (CTL) 305, the display (LCD) 206, a panel controller A (PNL A) 307, a panel controller B (PNL B) 308, a waveform communication controller (W COM) 309, a communication controller (COM) 310, the selected input channel section (IN SEL) 205, the selected output channel section (OUT SEL) 208, the scene section (SCN) 209, the output channel section (OUT) 207, the input channel sections (IN A to D) 201 to 204, the meter (MTR) 210 and a connection bus 311. The connection bus 311 is illustrated as a single bus line for the convenience of description, but actually, it is formed of a plurality of bus lines for section-to-section information exchange.

In FIG. 3, boxes depicted in bold lines represent functional blocks each having a CPU and a flash memory therein. In addition, the console 101 (111, 131) itself is also a functional block equipped with the CPU 301 and the flash memory (CMAIN) 302, except for the blocks represented by the boxes in bold lines. The flash memory in each functional block stores a control program for controlling the operation of the functional block, and the CPU in the functional block executes the control program, whereby the functional block operates to perform its predetermined function. The functional blocks exchange information as required. The versions of the control programs for the functional blocks are controlled and each can be upgraded by execution of a version upgrade program. The term "version" means the version of the control program stored in the flash memory provided in each of the functional blocks, but for the convenience of description, the version of a control program will be referred to as the version of a block or functional block. For example, the version of the control program stored in the flash memory provided in the CTL 305 is referred to as "the version of the CTL 305".

Next, a description will be given of the component parts of the console 101 (111, 131). The CPU 301 executes the control program stored in the CMAIN 302 to thereby control the overall operation of the console 101 (111, 131). The CTL 305 gives various instructions to the CPU 301 to control the operation of the console 101 (111, 131). In the present embodiment, the version of the CTL 305 is used as a reference to check whether the versions of the other functional blocks match the version of the CTL 305. The LCD 206 displays various kinds of information in response to instructions from the CTL 305. The RAM 303 is a working memory that stores programs executed by the CPU 301 and various data used by the same. The O COM 304 is an interface for connection to an external computer or an external MIDI apparatus. By connecting a PC to the O COM 304, it is possible to upgrade the respective control programs for the functional blocks of the console, the engine, or the units.

The PNL A 307 is a panel control board for controlling the sections 205, 208, 209, 207. Similarly, the PNL B 308 is a panel control board for controlling the sections 201 to 204, and 210. The W COM 309 performs communication control related to various waveform signals. For example, input/output terminals of a monitoring microphone and a monitoring loudspeaker are connected to the W COM 309. In FIG. 3, dotted arrowhead lines to and from the W COM 309 indicate input/output of waveform signals. The COM 310 is a communication controller for exchanging control signals e.g. with the engine. During dual-console operation, communication with a second console is performed via the W COM 309 and the COM 310, similarly to communication with the engine.

Figure 4:
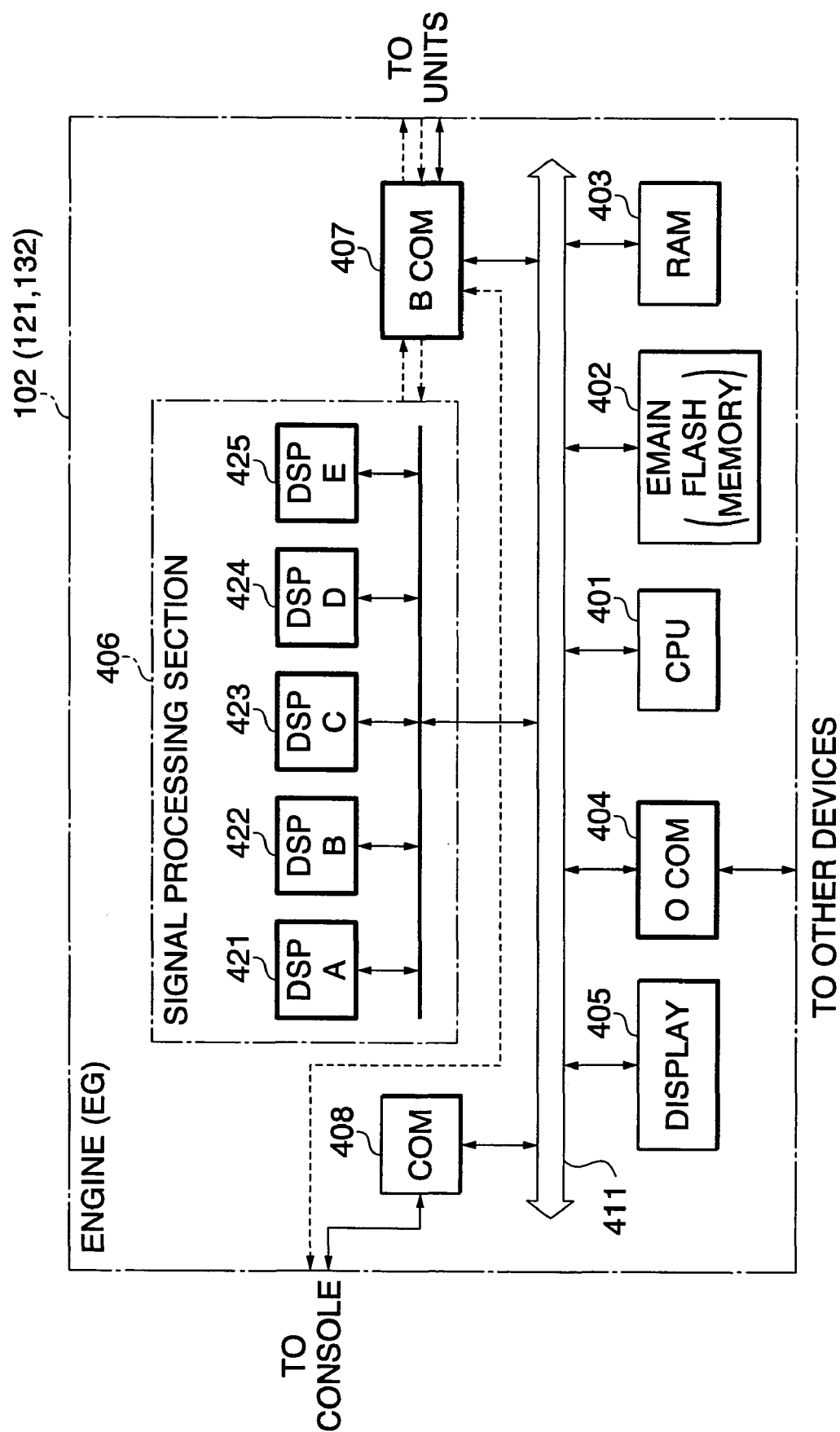
FIG. 4 is a block diagram showing the internal hardware configuration of one of engines appearing in FIG. 1.

FIG. 4 is a block diagram showing the internal hardware configuration of each of the engines 102, 121, 132). The engine 102 (121, 132) is comprised of a CPU 401, a flash memory (EMAIN) 402, a RAM 403, a communication controller (O COM) 404, a display 405, a signal processing section 406, a communication controller (B COM) 407, a communication controller (COM) 408, and a connection bus 411. The connection bus 411 is illustrated as a single bus line for the convenience of description, but actually, it is formed of a plurality of bus lines for section-to-section information exchange.

In FIG. 4, similarly to FIG. 3, boxes in bold lines represent functional blocks each having a CPU and a flash memory therein. The engine 102 (121, 132) itself is also a functional block equipped with the CPU 401 and the flash memory (EMAIN) 402, except for the blocks represented by the boxes in bold lines. The flash memory in each functional block stores a control program for controlling the operation of the functional block, and the version of the control program for the functional block can be upgraded by execution of a version upgrade program. The respective versions of the functional blocks (including the control program stored in the EMAIN 402) of the engine 102 (121, 132) are checked using the version of the CTL 305 as the reference. In the version check, it is also checked whether or not any of the functional blocks is abnormal (e.g. in failure). Similarly, in the version check of the console 101 (111, 131), it is checked whether or not any of the functional blocks is abnormal (e.g. faulty).

Next, a description will be given of the components of the engine 102 (121, 132). The CPU 401 executes the control program stored in the EMAIN 402 for control of the overall operation of the engine 102 (121, 132). In particular, the CPU 401 controls the operation of the engine 102 (121, 132) based on a control signal received from the console 101 (111, 131) via the COM 408 and a control signal received via the O COM 404. The RAM 403 is a working memory that stores programs executed by the CPU 401 and various data used by the same. The O COM 404 is an interface for connection to an external computer and an external MIDI apparatus. By connecting a PC to the O COM 404, it is possible to upgrade the respective control programs of the functional blocks of the console, the engine, or the units. The display 405 is an LCD that displays information, such as a state of the engine. The B COM 407 is a communication controller that exchanges waveform signals and control signals with the console 101 (111, 131) and the aforementioned units. The COM 408 is a communication controller that exchanges control signals with the console 101 (111, 131). DSP's 421 to 425 of the signal processing section 406 execute various signal processing (including mixing of waveform signals input from the units, and application of effects) in response to instructions from the CPU 401.

The analog input (AIN) unit 501, the analog output (AOUT) unit 502, and the digital input/output (DI/O) unit 503, shown in FIG. 5, that form the units 103 in FIG. 1, are functional blocks each equipped with a CPU and a flash memory storing a control program to be executed by the CPU. The respective versions of the control programs can be upgraded using the PC connected to the console 101 (111, 131) or the engine 102 (121, 132). The versions are checked using the version of the CTL 305 as the reference.

Figure 6:
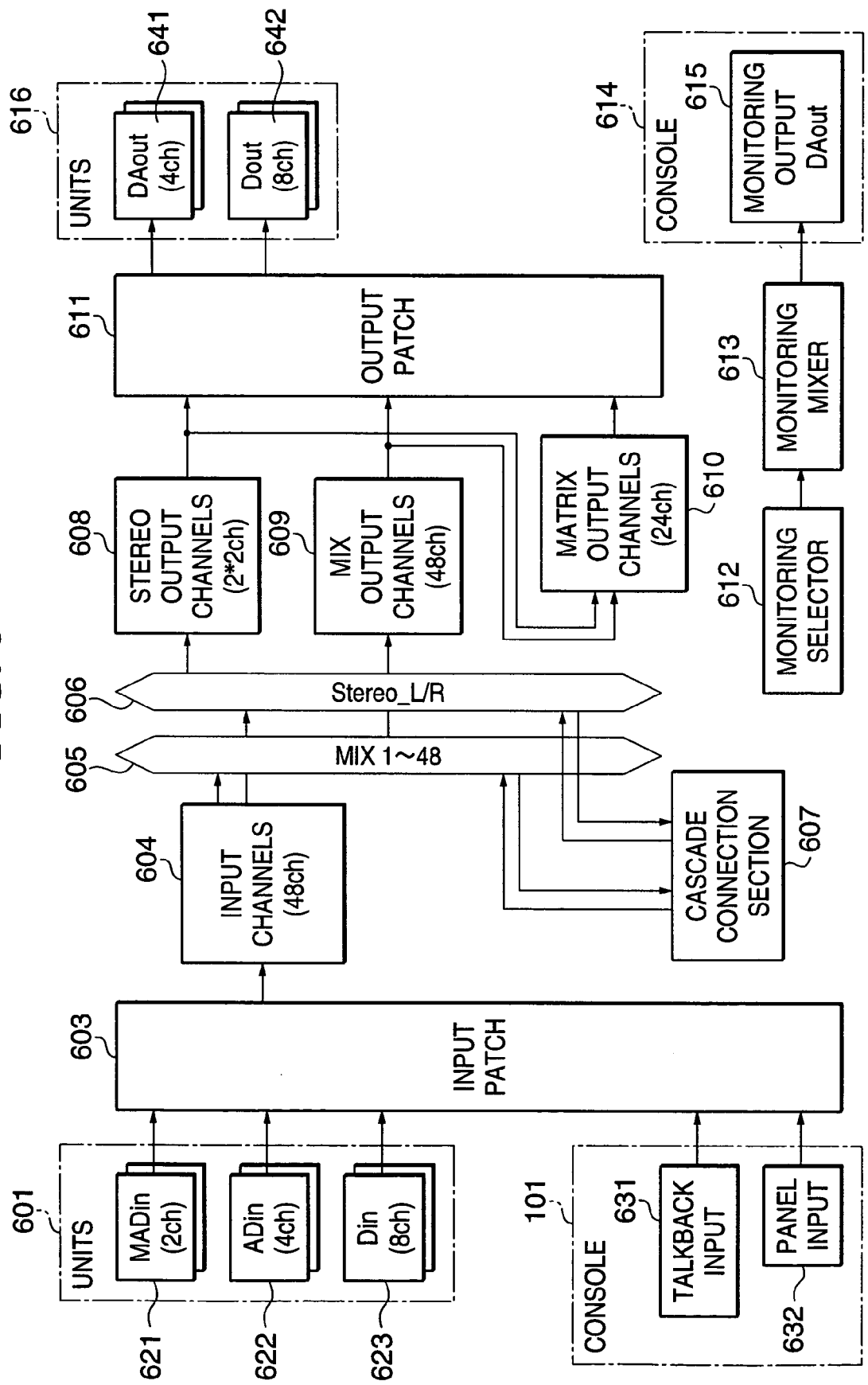
FIG. 6 is a block diagram showing flows of signals in the digital mixer according to the present embodiment.

FIG. 6 is a block diagram showing flows of signals in the digital mixer according to the present embodiment. In FIG. 6, reference numeral 601 designates the signal input units (corresponding to the units 501, 503 in FIG. 5) of the units 103, 133 in FIG. 1. A plurality of units can be connected to both of the input side and output side of the digital mixer, but in FIG. 6, the signal input units are collectively designated by a box in broken lines. Input (MADin) 621 represents input of a microphone signal by an analog/digital conversion input board. Input (ADin) 622 represents input of a line signal by an analog/digital conversion input board. Input (Din) 623 represents input of a digital signal by a digital input/output board. The above three kinds of boards can be additionally provided on a board-by-board basis by being inserted into the AIN unit 501 or the DI/O unit 503 connected to the input side of the engine. Talkback input 631 of the console 101 is used when an operator of the console 101 communicates instructions to a stage. Panel input 632 of the same represents input of a waveform, such as that of an effect sound directly input from the console 101.

Processing from an input patch 603 to an output patch 611 is executed by the engine 102. The input patch 603 performs desired connection of the input system (621 to 623, 631, 632) to input channels (48ch). The user can configure the connection as desired while viewing a predetermined screen using the console 101. Signals from the input channels 604 are selectively output to desired channels of a MIX bus 605 having 48 bus lines and a stereo bus (Stereo_L/R) 606.

The MIX bus 605 mixes signals received from the input channels 604. The mixed signal is output to a corresponding one of MIX output channels 609. The stereo bus 606 mixes signals received from the input channels 604. The mixed stereo signal is output to stereo output channels 608. The outputs to the stereo output channel 608 and the MIX output channel 609 are delivered to the output patch 611 and matrix output channels 610. The matrix output channels 610 can selectively receive a desired number of signals from the stereo output channels 608 and the MIX output channels 609, and further mix the selectively input signals. An output from the matrix output channels 610 is delivered to the output patch 611. The output patch 611 performs desired connection of the three kinds of output channels 608 to 610 to an output system (DAout 641, Dout 642).

Reference numeral 616 designates signal output units (corresponding to the units 502, 503 shown in FIG. 5) of the units 103, 133. Output (DAout) 641 represents output to a digital/analog conversion output board. Output (Dout) 642 represents output to a digital output board. The above two kinds of boards can be additionally provided on a board-by-board basis by being inserted into the AOUT unit 502 or the DI/O unit 503 connected to the output side of the engine.

A cascade connection section 607 is an interface for cascaded connection of the engines as illustrated by the bold broken lines C in FIG. 1. Connection of the engine of the present mixer to another engine via the cascade connection section 607 enables the two engines to share the buses 605, 606. A monitoring selector 612, a monitoring mixer 613, and a monitoring output (DAout) 615 of a console 614 form a mechanism for monitoring the signals of channels.

Figure 7:
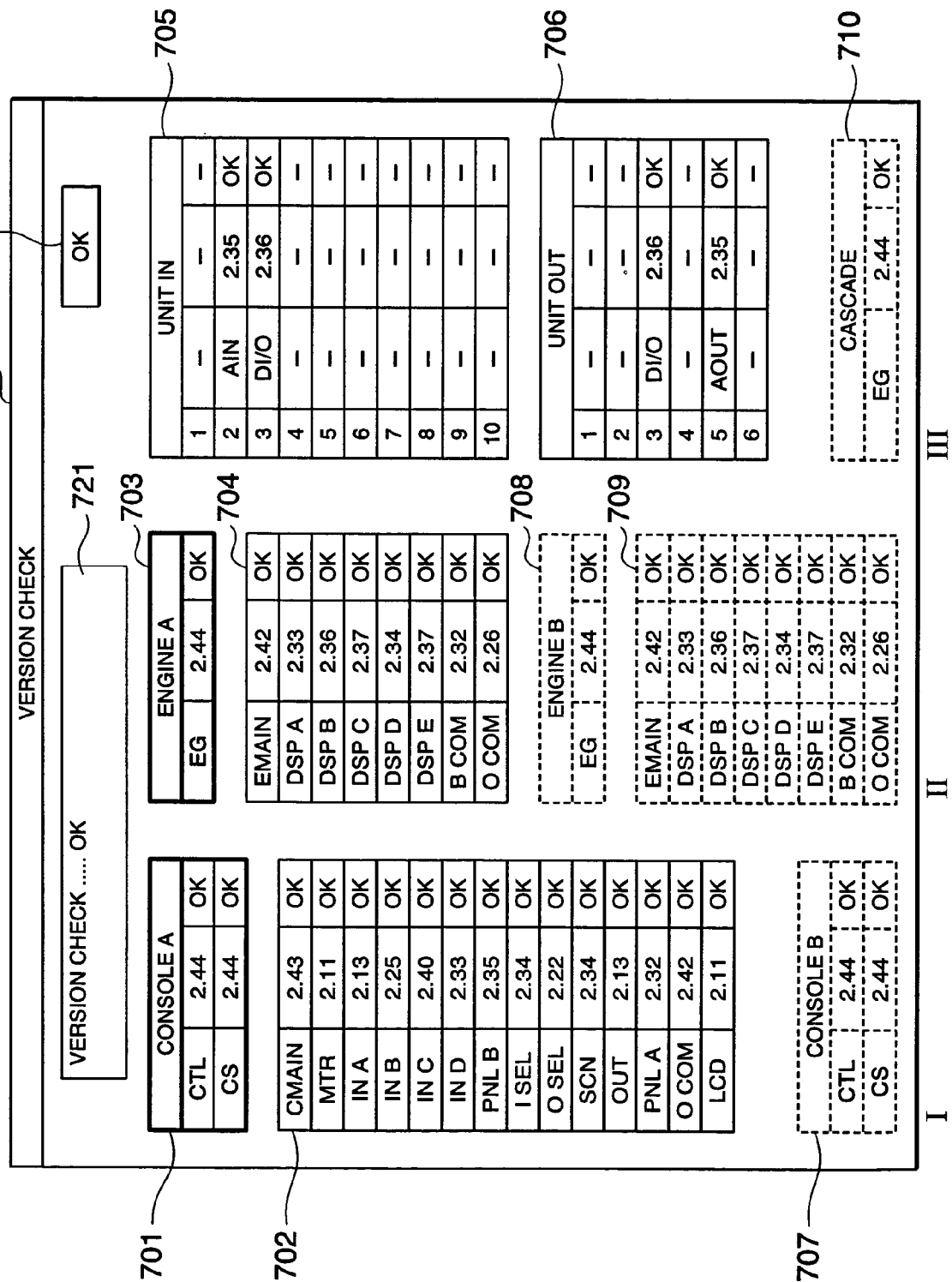
FIG. 7 is a diagram showing an example of a version check dialog box displayed on a display (LCD) of one of the consoles.

FIG. 7 shows an example of a version check dialog box displayed on the display (LCD) 206 of the console 101. The version check dialog box is displayed when any mismatch is detected by version check automatically performed on the sections at the time of start-up of the digital mixer, or when a version check switch, not shown, is depressed by the user. When no mismatch is detected in the respective versions of the functional blocks at the time of start-up of the digital mixer, this version check dialog box is not displayed. The version check is also performed when new connection of a functional block, or abnormality, such as disconnection of a functional block or failure of a functional block, is detected, and then, the results of the version check are displayed in the version check dialog box.

In the version check dialog box 700, a plurality of tables 701 to 710, a message area 721, and an OK button 722 are displayed. The table 701 shows the version of the CTL 305 of the console 101 and that of the whole of the other functional blocks. In FIG. 7, an indication "CTL 2.44 OK" means that the version of the CTL 305 is 2.44, and matches the versions of the other functional blocks. An indication "CS 2.44 OK" means that the version of the whole of the console (CS) 101 except the CTL 305 is 2.44, and matches the version of the CTL 305. The table 702 shows the details of the versions and matching states of the functional blocks collectively displayed in the table 701 as "CS 2.44 OK", i.e. versions and matching states of the functional blocks other than the CTL 305. For example, an indication "CMAIN 2.43 OK" means that the version of the control program stored in the CMAIN 302 is 2.43, and matches the version of the CTL 305. An indication "MTR 2.11 OK" means that the version of the MTR 210 is 2.11, and matches the version of the CTL 305. Similarly, in the following, matching states of the versions of the other functional blocks shown in the boxes in bold lines in FIG. 3 with respect to the version of the CTL 305 are also displayed. When a mismatch between the version of a block and the version of the CTL 305 is detected, the matching state is displayed not as "OK" but as "NG". If any of the functional blocks in the table 702 is displayed as NG, the matching state of the CS in the table 701 is also displayed as NG.

The table 703 shows the version and matching state of the whole of the engine (EG) 102. The table 704 shows the versions and matching states of the functional blocks of the engine 102 (121, 132). If any of the functional blocks in the table 704 is displayed with NG, the matching state of the ES 102 in the table 703 is also displayed as NG. The tables 705 and 706 show the versions and matching states of the units (FIG. 5) connected to the engine 102. Numerals 1 to 10 in the table 705 designate unit connection terminals on the input side of the engine. In the illustrated example, the AIN unit 501 is connected to the second connection terminal, and the DI/O unit 503 to the third connection terminal. Numerals 1 to 6 in the table 706 designate unit connection terminals on the output side of the engine. In the illustrated example, the DI/O unit 503 is connected to the third connection terminal, and the AOUT unit 502 to the fifth connection terminal. The display format of versions and matching states is the same as that of the tables 701 to 704. A mark "-" in the tables 705, 706 indicates that there is no unit connected to a corresponding connection terminal.

The table 707 shows the version of the CTL 305 and the version of the whole of the other functional blocks of the slave console 111 in the case of the dual-console system being employed as described hereinabove by referring to the thin broken lines A in FIG. 1. The table 707 is displayed only when the dual-console type digital mixer is in operation, and therefore, shown by broken lines (the same applies to the tables 708 to 710, described hereinafter). An indication "CTL 2.44 OK" in the table 707 shows the version and the matching state of the CTL 305 of the slave console 111. An indication "CS 2.44 OK" shows the version and matching state of the whole of the functional blocks of the slave console 111 other than the CTL 305. The respective matching states of the functional blocks other than the CTL 305 are determined using the version of the CTL 305 of the master console 101 as the reference. The individual versions and matching states of the functional blocks of the slave console 101 (similar to those in the table 702) are displayed not on the display of the master console 101, but on the display of the slave console 111.

The table 708 shows the version and matching state of the whole of the engine 121 additionally provided for the engine mirroring described hereinabove by referring to the thin broken lines B in FIG. 1, while the table 709 shows the individual versions and matching states of the functional blocks within the engine 121. The respective matching states of the functional blocks of the added engine 121 in the tables 708, 709 are determined using the version of the CTL 305 of the master console 101 as the reference.

The table 710 shows the version and matching state of the whole of the engine 132 of the slave system cascaded to the master system, as described hereinabove by referring to the bold broken lines C in FIG. 1. The table 710 is displayed similarly to the table 703. The matching state of the cascaded engine 132 is determined using the version of the CTL 305 of the master console 101 as the reference. The individual versions and matching states of the console 131 and the units 133 on the slave side are displayed on the display of the master console 131 of the slave system.

The message display area 721 displays results and the like of version check. In FIG. 7, there is illustrated, by way of example, a message displayed when the results of version check are OK. The OK button 722 is for the user to depress when the operation of the mixer is continued.

Figures 8A, 8B, 9:
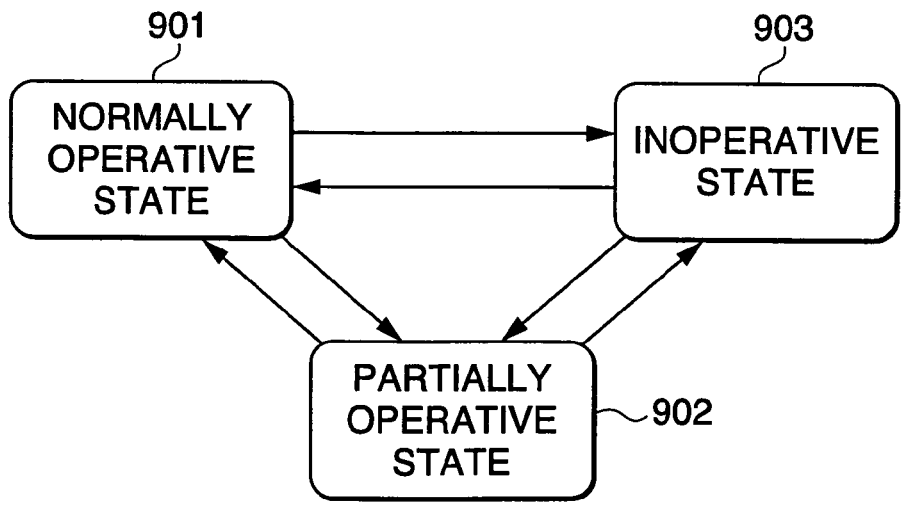
FIG. 8A is a diagram showing examples of messages displayed in a message area when a version mismatch is not fatal to the continued overall operation of the digital mixer.
FIG. 8B is a diagram showing examples of messages displayed in the message area when a version mismatch is fatal to the continued overall operation of the digital mixer.
FIG. 9 is a diagram showing state transitions of the digital mixer.

Although in FIG. 7, the message indicating that the results of version check are OK, if at least one functional block with a mismatching version of a control program is detected, a message is displayed to notify the user of the fact. Assuming that the version of a functional block mismatches, the mismatch may or may not be fatal to the continued overall operation of the digital mixer. FIG. 8A shows examples of messages displayed in the message display area 721 when the mismatch of the version of a functional block is not fatal to the continued overall operation of the digital mixer. In FIG. 8A, reference numeral 801 designates an example of a message displayed when there is no response from the functional block, while reference numeral 802 designates an example of a message displayed when there is a response from the functional block, but the version of the functional block mismatches (with the reference version). When the message 801 or 802 is displayed in the message display area 721, the OK button 722 is displayed. Then, when the operator depresses the OK button, communication with the functional block having a program of the mismatching version is cut off, and operations of the other functional blocks having programs of matching versions are continued. Alternatively, there may be provided a button for use in forcibly stopping the operation of a functional block with a mismatching version. FIG. 8B shows examples of messages displayed in the message display area 721 when the mismatch of the version of a functional block is fatal to the continued overall operation of the digital mixer. In FIG. 8B, reference numeral 803 designates an example of a message displayed when there is no response from the functional block, while reference numeral 804 designates an example of a message displayed when there is a response from the functional block, but the version of the functional block mismatches. In these cases, the OK button is not displayed, and the overall operation of the digital mixer is completely stopped.

FIG. 9 is a diagram showing state transitions of the digital mixer according to the present embodiment. When the power of the digital mixer is turned on, if the functional blocks are detected to be all normal and at the same time without any mismatching version, the digital mixer enters a normally operative state 901. On the other hand, when the power of the digital mixer is turned on, if an abnormality or a version mismatch of a functional block which is fatal to the continued overall operation of the digital mixer is detected, the digital mixer enters an inoperative state 903. Further, when the power of the digital mixer is turned on, if an abnormality or a version mismatch of a functional block which is not fatal to the continued overall operation of the digital mixer is detected, the digital mixer enters a partially operative state 902. The digital mixer transits from one of these states to another even during operation of the digital mixer. For example, when an abnormality occurs in a functional block, or a functional block is newly added during normal operation of the digital mixer in the normally operative state 901, version check is performed, and then the results of the version check are displayed, whereafter the digital mixer enters the partially operative state 902 or the inoperative state 903. When the digital mixer is in the partially operative state 902 or the inoperative state 903, if a board having the functional block suffering from the abnormality or the version mismatch is replaced with a new one, for example, so as to normalize all the functional blocks, the digital mixer performs the transition from the partially operative state 902 or the inoperative state 903 to the normally operative state 901.

In the following, version check of functional blocks will be described in detail.

First, a detailed description will be given of version check of the respective functional blocks of the console 101 of the main system (hereinafter referred to as "the main console"). In the main console 101, when the version of any of the CMAIN 302, the MTR 210, the PNL A 307, the PNL B 308 and the LCD 206 mismatches the version of the CTL 305 as the reference, or any of the functional blocks is abnormal, the version mismatch or the abnormality of the functional block is fatal to the continued overall operation of the digital mixer, and therefore the digital mixer enters the inoperative state 903. On the other hand, when a version mismatch or an abnormality is detected in any of the functional blocks of the main console 101 other than the above, the version mismatch or the abnormality is not fatal to the continued overall operation of the digital mixer, and therefore the digital mixer enters the partially operative state 902.

It is assumed here that criteria for judgment on the respective matching states of the versions of the functional blocks, using the version of the CTL 305 of the main console 101 as the reference, are stored in a predetermined storage area (e.g. in the CMAIN 302). In the tables 701, 702, for example, the version of the MTR is 2.11 while the version of the CTL is 2.44. Versions of the MTR which can match the version 2.44 of the CTL are listed in the above-mentioned criteria for judgment, and therefore, in this case, it is judged, by referring to the criteria, that the version 2.11 of the MTR matches. Further, it is also assumed here that criteria for determining whether or not the version mismatch or abnormality of each functional block is fatal to the continued overall operation of the digital mixer are also stored in the predetermined storage area (e.g. in the CMAIN 302).

Next, version check performed on a unit (FIG. 5) will be described in detail. When the power of the digital mixer is turned on, and when new connection of a unit to the engine is detected, version check is performed on the unit. In this version check, it is also checked whether or not the unit is abnormal (e.g. faulty). A unit connection terminal of the engine does not always require connection of a unit, and therefore the matching state of a unit is not determined as NG simply because it is not connected to the engine. If the version of a newly connected unit mismatches, the digital mixer displays the matching state of the newly connected unit as NG in the dialog box (FIG. 7), and then cuts off communication with the unit to enter the partially operative state 902.

A description will be given of version check performed when the digital mixer is configured for dual-console operation. In the case where the dual console mode is set, the version of the slave console is checked when the power of the digital mixer is turned on, and when connection of a slave console is detected. If the slave console is not connected, the matching state of the slave console is not determined as NG, but single-console operation is carried out (operation by the master console alone is continued). If the slave console is connected, and at the same time the version thereof mismatches, the digital mixer displays the matching state of the slave console as NG in the dialog box (the table 707 in FIG. 7), and enters the inoperative state 903. Thereafter, when the slave console is disconnected, the indication in the dialog box is deleted, and the single-console operation is resumed. If the slave console is connected, and at the same time the version thereof matches, the matching state of the slave console is determined as OK, and therefore the digital mixer immediately enters the normally operative state 901 to start the dual-console operation. In the dual-console operation, first, the digital mixer checks the master-slave relationship between the master console and the slave console. Then, if there is no problem, the digital mixer establishes dual-console connection. If two consoles are both set as master consoles or slave consoles, the dual-console connection is not established. When the dual-console connection is established, it is possible to use both the master console and the slave console for control of the mixing process performed by the engine connected thereto.

Version check performed when the digital mixer is configured for mirroring of engines will now be described in detail. In the case of the engine mirroring, there is no master-slave relationship between two engines, and therefore the engine originally provided in the digital mixer is set to a first engine, and the other engine connected for the engine mirroring is set to a second engine.

In the case where the mirroring of engines is set, the version of the second engine is checked when the power of the digital mixer is turned on, and when connection of the second engine is detected. The version check operation is basically similar to that for the dual console, and insofar as a second engine with a mismatching version is connected to the digital mixer, the digital mixer is held in the inoperative state 903. In mirroring, since there is no master-slave relationship between two engines as mentioned above, only if the first engine and the second engine match in version, the digital mixer immediately enters the normally operative state 901, with the mirror connection established. Once the mirror connection is established, the console controls the two engines such that they perform the same operation. If a selected one of the engines fails, the operation of the digital mixer is automatically or manually switched to the operation using the other engine.

A detailed description will be given of version check performed when the digital mixer is configured for cascading of a slave system to a master system. In the case where the master system is set to cascade connection to the slave system, version check is performed on the second engine, when the power of the slave system is turned on, and when connection of the second engine is detected. The version check operation is basically similar to that for the dual console. For cascade connection, first, the master-slave relationship between the master system and the slave system is checked. Then, when there is no problem, the two systems are both caused to enter the normally operative state 901, with the cascade connection established. When two systems are both set as master systems or slave systems, the cascade connection is not established. When the cascade connection is established, the mixing buses of the two mixer systems are connected to each other, whereby the system of the digital mixer having a doubled number of channels as a whole is constructed.

Although examples of version check are described in the above, if any of the functional blocks is detected to be abnormal (e.g. when any of the functional blocks is in a disconnected state, or when failure of a functional block is detected), data displayed in the version check dialog box is changed by rewriting, because the matching state of the functional block becomes NG. For example, when an abnormality is detected in the IN C 327 (this is not a fatal abnormality), the main CPU 301 of the console 101 issues an instruction to the IN C 327 to stop operation thereof, and at the same time issues an instruction to the PNL B 308 to stop communication with the IN C 327. Further, the matching state of the IN C 327 in the table 702 is changed from OK to NG by rewriting. In another example, when an abnormality is detected in the CTL 305 (this is a fatal abnormality), the main CPU 301 of the console 101 issues instructions to all the functional blocks (including the console, engine, and units connected thereto) to stop operations thereof.

Figure 10A:
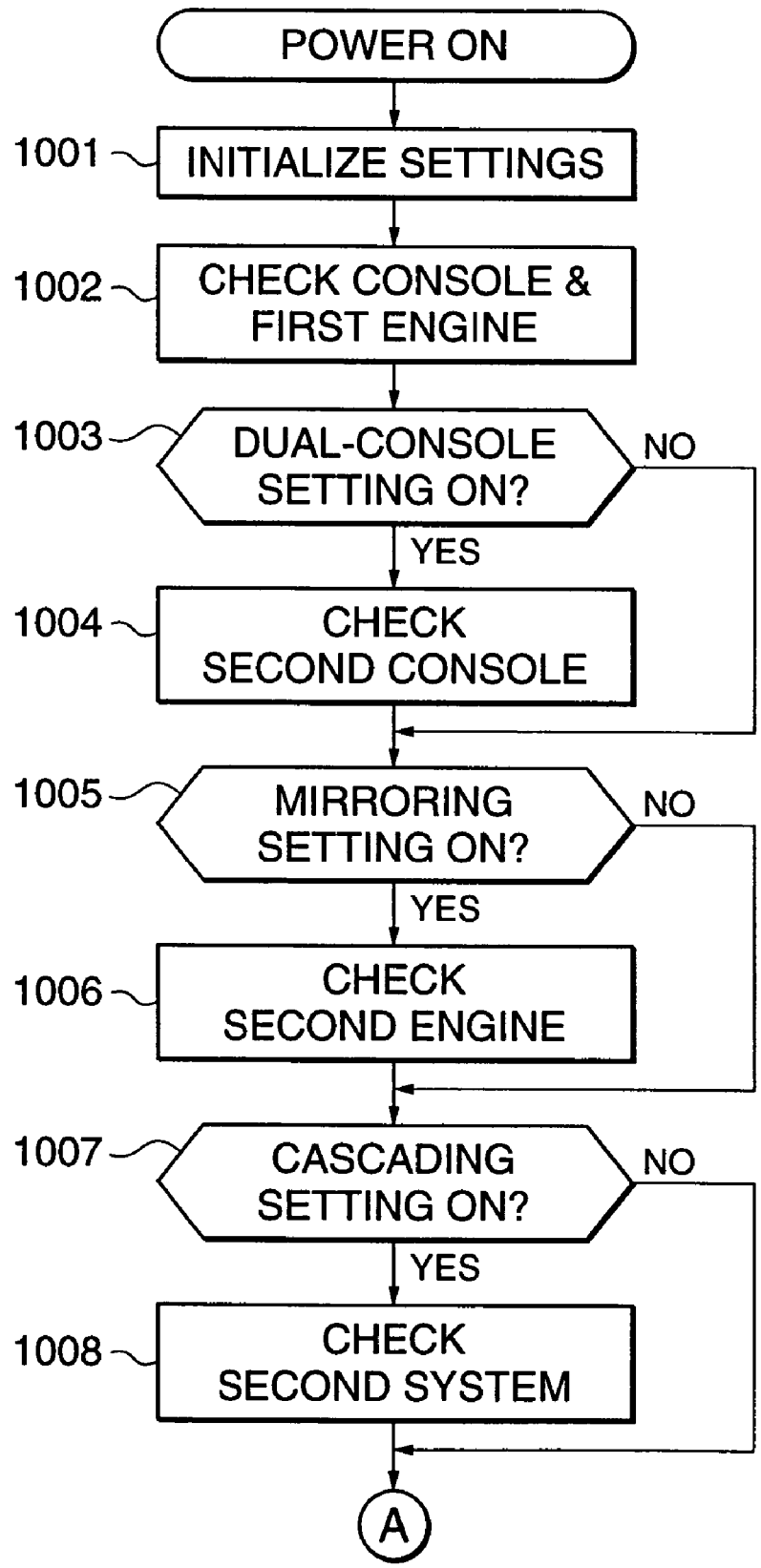
Figure 10B:
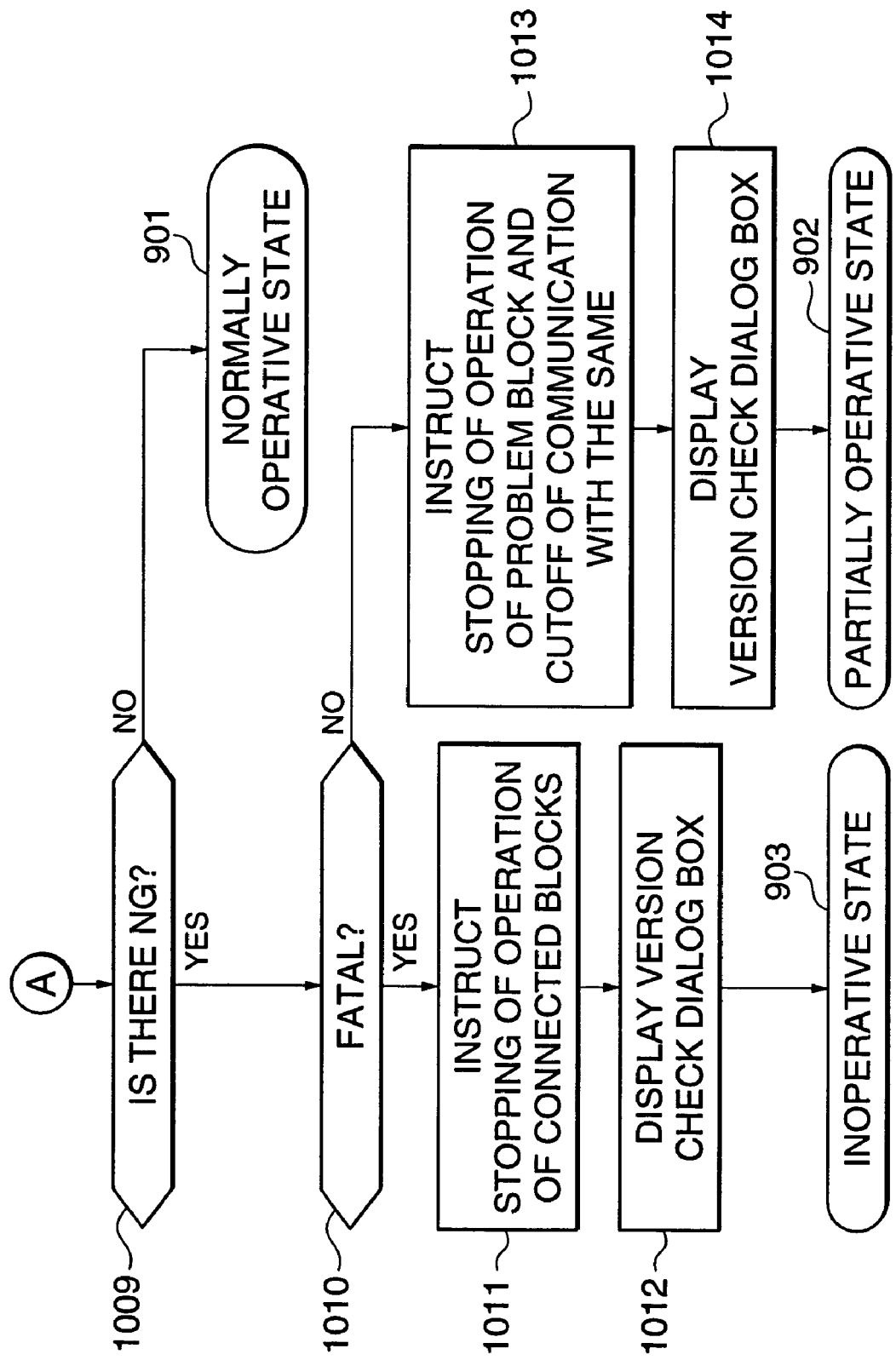

FIGS. 10A–10B are flowchart showing processing executed by the main CPU 301 of the console 101 shown in FIG. 3, when the power of the digital mixer is turned on. The main CPU 301 carries out initialization of settings in a step S1001, and then checks the respective versions of the functional blocks of the first (master) engine connected to the master console, in a step S1002. The versions of functional blocks can be obtained by issuing an inquiry to them. It is determined in a step S1003 whether or not the digital mixer has been configured for dual-console operation (dual-console setting is ON). If the dual-console setting is ON, the respective versions of the functional blocks of the second (slave) console are checked in a step S1004. Then, it is determined in a step S1005 whether or not the digital mixer has been configured for mirroring of engines (mirroring setting is ON). If the mirroring setting is ON, the respective versions of the functional blocks of the second engine are checked in a step S1006. Then, it is determined in a step S1007 whether the digital mixer has been configured for cascading of engines (cascading setting is ON). If the cascading setting is ON, the respective versions of the functional blocks of the second (slave) system are checked in a step S1008.

In a step S1009, it is determined whether or not any mismatching version or abnormal functional block has been detected through the above version check. If no mismatching version or abnormal functional block has been detected through the above version check, the digital mixer ransits to the normally operative state 901 to continue operation thereof. If a mismatching version or an abnormal functional block has been detected through the above version check, it is determined in a step S1010 whether or not the mismatch of the version or the abnormality of the functional block is fatal to the continued overall operation of the digital mixer. If the mismatch of the version or the abnormality of the functional block is fatal to the continued overall operation of the digital mixer, in a step S1011, the main CPU 301 issues an instruction for stopping operations of the functional blocks connected to the digital mixer. Then, in a step S1012, the dialog box described hereinabove with reference to FIG. 7 is displayed, and the digital mixer ransits to the inoperative state 903. If the mismatch of the version or the abnormality of the functional block is not fatal to the continued overall operation of the digital mixer, in a step S1013, the main CPU 301 issues an instruction for stopping the operation of the functional block having the problem and cutting off communication with the functional block. Then, in a step S1014, the dialog box is displayed, and the digital mixer ransits to the partially operative state 902.

Figure 11:
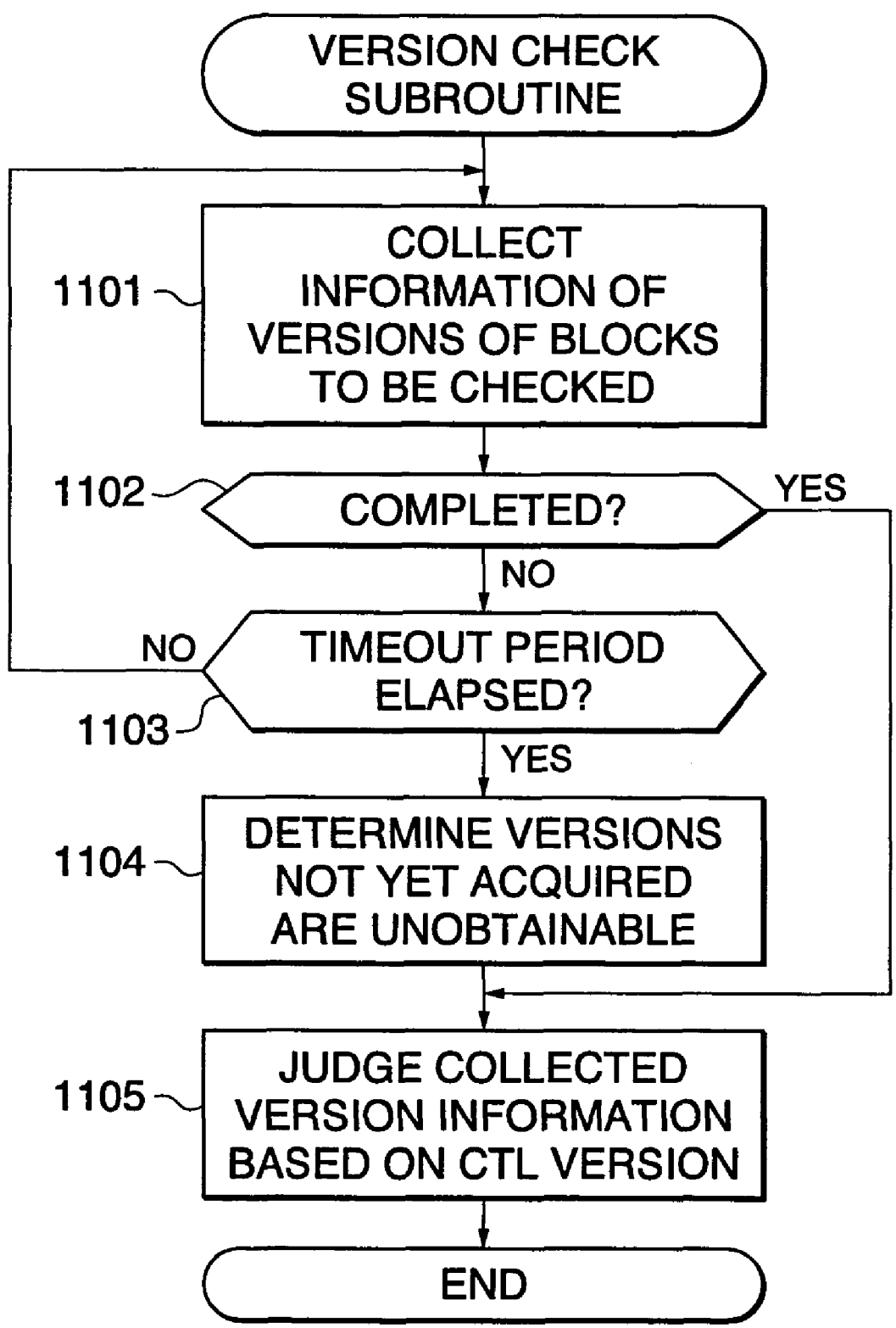
FIG. 11 is a flowchart showing details of a version check process which is executed in steps S1002, S1004, S1006 and S1008 in FIGS. 10A–10B (and steps S1201, S1211 in FIGS. 12A, 12B)

FIG. 11 is a flowchart showing details of the version check process executed in the steps S1002, S1004, S1006, and S1008 in FIGS. 10A–10B (or steps S1201 and S1211 in FIGS. 12A and 12B, referred to hereinafter). In a step S1101, information of respective versions of functional blocks to be checked is collected. It is determined in a step S1102 whether or not the collection of version information has been completed, and if it has been completed, the process proceeds to a step S1105. If the collection of version information has not been completed, it is determined in a step S1103 whether or not a timeout period for the collection of version information has elapsed. The version information collecting processing from the step S1101 to the step S1103 is repeatedly carried out until the process is timed out in the step S1103. Upon timeout (YES to step 1103), it is determined that version information yet to be collected is not obtainable, and the process proceeds to the step S1105, wherein it is determined whether or not the collected version information matches the version of the CTL as the reference.

The determination as to the abnormality of a functional block is carried out based on whether the control program provided for the functional block to be checked operates normally.

Figure 12B:
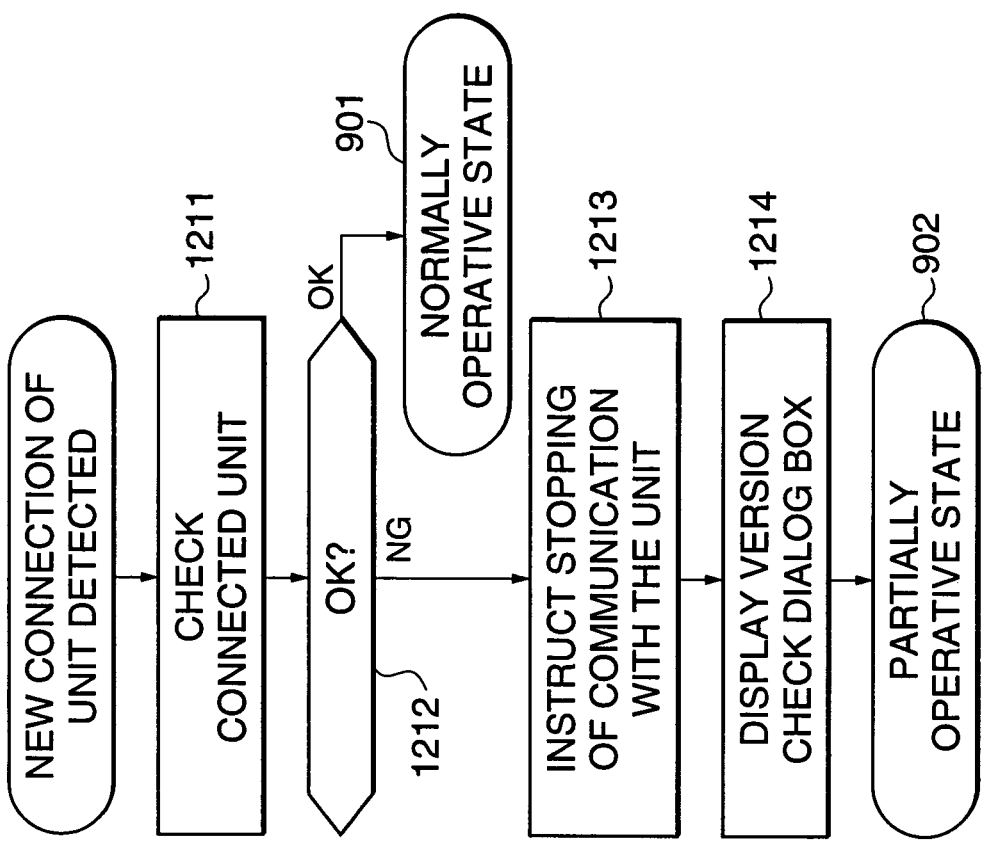
FIG. 12B is a flowchart of processing executed when new connection of a unit has been detected.
Figure 12A:
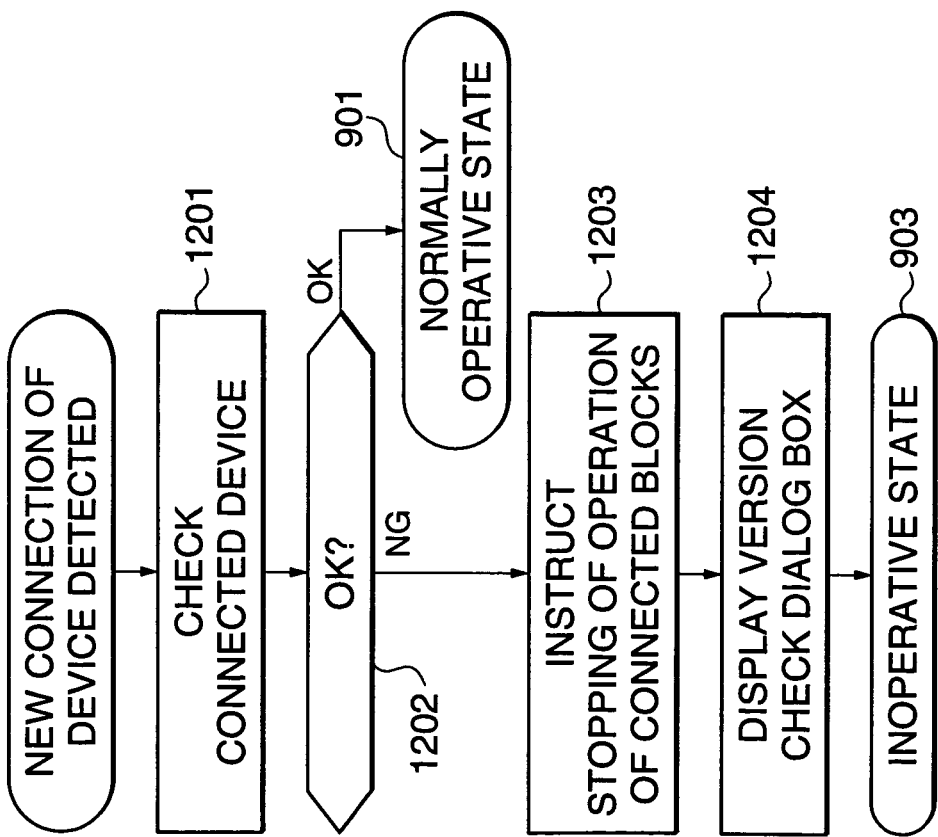
FIG. 12A is a flowchart of processing executed when the console has detected new connection of an engine or a second console.

FIG. 12A is a flowchart showing processing executed when the console has detected new connection of an engine or a second console. In a step S1201, the respective versions of the functional blocks of a newly connected device are checked. In a step S1202, it is determined whether or not the versions match the version of the CTL as the reference. If the versions match the version of the CTL as the reference, the digital mixer transits to the normally operative state 901. If any of the versions does not match the version of the CTL as the reference, instructions for stopping the respective operations of the functional blocks connected to the console are issued in a step S1203, and in a step S1204, the version check dialog box is displayed so as to give indications concerning the newly connected engine or console. More specifically, assuming that an engine is connected to the console, if the engine is a first one, the matching states of the versions are displayed in the tables 703 and 704. Connection of a second engine is detected only when the mirroring setting is ON, and matching states concerning the second engine are displayed in the tables 708 and 709. On the other hand, connection of a second console is detected only when the dual-console setting is ON, and matching states concerning the second console are displayed in the table 707. After execution of the step S1204, the digital mixer transits to the inoperative state 903. More specifically, in the present embodiment, when a version mismatch occurs when consoles or a console and an engine are connected, it is judged that the version mismatch is fatal, and the digital mixer transits to the inoperative state 903. Also in this case, it is possible to disconnect the console or engine with which the version mismatch has occurred, to thereby restore the digital mixer from the inoperative state 903 to the normally operative state 901.

FIG. 12B is a flowchart showing processing executed when new connection of a unit is detected. In a step S1211, the respective versions of the functional blocks of the newly connected unit are checked. In a step S1212, it is determined whether or not the versions of the functional blocks of the newly connected unit match the version of the CTL as the reference. If the versions match the version of the CTL as the reference (YES to step 1212), the digital mixer transits to the normally operative state. If any of the versions of the functional blocks of the newly connected unit does not match the version of the CTL as the reference, an instruction for cutting off communication with the unit is issued in a step S1213, and in a step S1214, the version check dialog box is displayed so as to give indications concerning the newly connected unit. More specifically, when an input-side unit is connected to the engine, the respective matching states of the versions of the functional blocks of the unit are displayed in the table 705 at respective locations corresponding to terminals to which the unit is connected, while when an output-side unit is connected to the engine, the matching states of the respective versions of the functional block of the unit are displayed in the table 706 at respective locations corresponding to terminals to which the unit is connected. After execution of the step S1214, the digital mixer transits to the partially operative state 902. More specifically, when a version mismatch occurs between the engine and a unit, it is judged that the version mismatch is not fatal, and the unit is disconnected from the engine, and the digital mixer transits to the partially operative state 902.

Figure 12C:
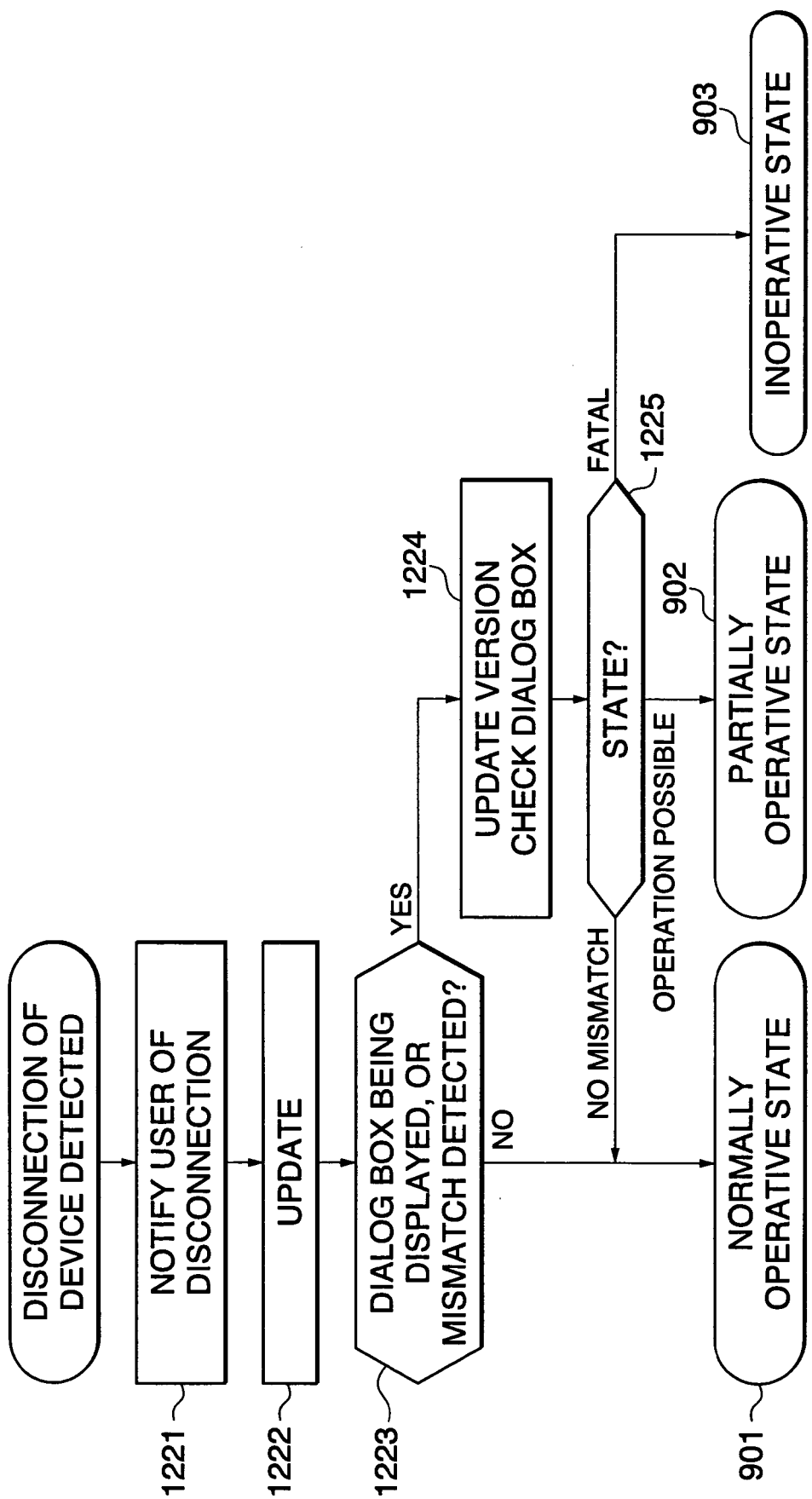
FIG. 12C is a flowchart of processing executed when disconnection of a device has been detected.

FIG. 12C is a flowchart showing processing executed when disconnection of a device is detected. In a step S1221, the user is notified e.g. by screen display that the device is disconnected. In a step S1222, the state of the system is updated depending on which device is disconnected. For example, when during dual-console operation performed by two consoles connected to each other, if a console B is disconnected, the operation of the system transits to the single-console operation performed by a console A alone. Further, when a unit with a version mismatch is physically disconnected from the engine, the version mismatch associated with the unit is eliminated. Moreover, when a console and an engine both in the normally operative state are disconnected from each other, the digital mixer transits to a state in which the console is allowed to perform normal operation, but the digital mixer as the system is inhibited from perform mixing operation.

Then, in a step S1223, it is determined whether a disconnection is detected during display of the version check dialog box, or any version mismatch remains uneliminated even after the updating of the step S1222. If the answer to this question is affirmative (YES), the process proceeds to a step S1224, whereas otherwise, the digital mixer transits to the normally operative state.

In the step S1244, the version check dialog box is displayed (version check is performed simultaneously) so as to update indications displayed concerning the disconnected device. For example, when the console B is disconnected during dual-console operation, the table 707 associated with the partner console (i.e., the B console) is deleted. On the other hand, when a unit is disconnected from the engine, the matching state of the functional blocks of the unit in the table 705 or 706 is changed from OK to the mark "-". Further, when the console and the engine are disconnected from each other, the matching state of the disconnected engine in the table 703 is changed to NG. In a step S1225, when no version mismatch has been detected at all through the version check, the digital mixer transits to the normally operative state. When the operation of the digital mixer is possible despite a partially mismatching state of the versions of the functional blocks, the digital mixer transits to the partially operative state 902, whereas when a version mismatch is fatal to the continued overall operation of the digital mixer, the digital mixer transits to the inoperative state 903.

Thus, the dialog box shown in FIG. 7 is automatically opened when a version mismatch has been detected by execution of version check. Further, the user can also call the version check dialog box by operating the mouse.

As described heretofore, according to the present embodiment, when the power of the digital mixer is turned on, the matching states of the versions of all the functional blocks of the system are checked, and when no version mismatch is detected, the operation of the digital mixer is continued, whereas when a version mismatch is detected, a warning is given to the user. Therefore, the user can notice any version mismatch immediately after the power is turned on, and properly and easily manage the respective versions of the control programs operated by the CPU's of the functional blocks. Further, when a detected version mismatch is fatal, the digital mixer stops its operation, whereas when a detected version mismatch is not fatal, the digital mixer notifies the user that operation will be continued by ignoring the version mismatch, and then continues its operation in a state in which the block judged to mismatch in version is disconnected. Thus, in the latter case, it is possible to cause the digital mixer to continue its operation, when the user desires the continued operation of the digital mixer, even though it may be the minimum operation. Similarly, even when a functional block (device) has been connected anew, or when a failure or an abnormality has occurred, insofar as a version mismatch fatal to the overall operation of the digital mixer has not occurred, the digital mixer continues its operation in the partially operative state 902, which is convenient to the user who desires the continued operation of the digital mixer even though the operation is limited.

Although in the present embodiment, the digital mixer has a configuration in which the console, the engine, and the units are provided in separate bodies, the present invention may be applied to a digital mixer having a configuration in which these components are provided in one body, or to a digital mixer of a console-and-engine separation type. Further, although the version of the CTL is employed as the reference for version check, the version of any other functional block may be used as the reference.

Although in the present embodiment, the version of a control program represents the version of the corresponding functional block, the present invention is also applicable when a version is assigned to a board itself of functional blocks. For example, when a board serving as functional blocks is comprised of hardware without a CPU, or when the board is formed by a combination of hardware including a CPU and firmware, the board itself has a version assigned thereto, and therefore the matching state of this version may be checked.

Although in the dual-console operation by the digital mixer according to the present embodiment, when the slave console suffers from a version mismatch, the system of the digital mixer (master console+engine) enters the inoperative state 903 in FIG. 9, the system may enter a state (partially operative state 902) in which it continues operation as a single-console system. Similarly, in the mirroring of engines, when either of the two engines connected to each other suffers from a version mismatch, the mixer system may enter a state (partially operative state 902) in which operation is continued by the combination of the other engine free from a version mismatch and the console.

In the above described embodiment, the present invention is applied to the digital mixer, but it goes without saying that the invention can be applied to other various electronic apparatuses.

It also goes without saying that the object of the present invention may be accomplished by supplying a system or an apparatus with a storage medium in which a program code of software which realizes the functions of the above described embodiment, and causing a computer (CPU or MPU) of the system or apparatus to read out and execute the program code stored in the storage medium.

In this case, the program code itself read from the storage medium realizes the functions of the above described embodiment, and hence the storage medium on which the program code is stored constitutes the present invention.

Examples of the storage medium for supplying the program code include a floppy (registered trademark) disk, a hard disk, an optical disk, a magneto optical disk, a CD-ROM, a CD-R, a CD-RW, a DVD-ROM, a DVD-RAM, a DVD-RW, a DVD+RW, a magnetic tape, a nonvolatile memory card, and a ROM. Downloading via a network can also be utilized.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A digital mixer that includes a plurality of functional blocks and operates as a mixer by cooperation of the plurality of functional blocks, comprising:
    an acquisition device that acquires versions of the functional blocks when power of the digital mixer is turned on;
    a checking device that checks matching of the acquired versions of the functional blocks with a reference version; and
    a controller that causes the digital mixer to continue operation thereof when the checked versions of the functional blocks all match the reference version, and causes a warning to be given to a user when at least one of the checked versions of the functional blocks mismatches the reference version.

2. A digital mixer according to claim 1, wherein a version of at least one of the plurality of functional blocks is set to a reference version for the plurality of functional blocks.

3. A digital mixer according to claim 1, further comprising:
    a determination device operable when the at least one of the checked versions of the functional blocks mismatches the reference version, for determining whether or not the mismatch is fatal to an overall operation of the digital mixer, and
    a controller operable when the mismatch is fatal to the overall operation of the digital mixer, for causing the digital mixer to stop operation thereof, and when the mismatch is not fatal to the overall operation of the digital mixer, for issuing a notification that the operation of the digital mixer will be continued by ignoring the mismatch, and causing the digital mixer to continue operation thereof by disconnecting a functional block determined to mismatch, from the plurality of functional blocks.

4. A digital mixer according to claim 1, further comprising:
    a version acquisition and checking device operable when at least one new functional block is connected to the plurality of functional blocks, for acquiring a version of the at least one new functional block connected to the plurality of functional blocks, and checking matching of the acquired version with the reference version,
    a determination device operable when there is a mismatch between the checked version and the reference version, for determining whether or not the mismatch is fatal to an overall operation of the digital mixer, and
    a controller operable when the mismatch is fatal to the overall operation of the digital mixer, for causing the digital mixer to stop operation thereof, and when the mismatch is not fatal to the overall operation of the digital mixer, for issuing a notification that the operation of the digital mixer will be continued by ignoring the mismatch, and causing the digital mixer to continue operation thereof by disconnecting a functional block determined to mismatch, from the plurality of functional blocks.

5. A digital mixer according to claim 1, further comprising:
    an abnormality detecting device that detects abnormality of the plurality of functional blocks, a determination device operable when abnormality is detected in at least one of the plurality of functional blocks, for determining whether or not the abnormality is fatal to an overall operation of the digital mixer, and a controller operable when the abnormality is fatal to the overall operation of the digital mixer, for causing the digital mixer to stop operation thereof, and when the abnormality is not fatal to the overall operation of the digital mixer, for issuing a notification that the operation of the digital mixer will be continued by ignoring the abnormality, and causing the digital mixer to continue operation thereof by disconnecting the functional block determined to be abnormal, from the plurality of functional blocks.

6. A digital mixer according to claim 1, further comprising a display that displays results of checking by said checking device.

7. A digital mixer according to claim 1, wherein said checking device checks matching of the acquired versions of the functional blocks in at least one of a case where the power of the digital mixer has is turned on, a case where an instruction is input for checking a matching state of a version of at least one of the plurality of functional blocks, a case where at least one new functional block is connected to the plurality of functional blocks, and a case where at least one functional block is disconnected from the plurality of functional blocks.

8. A digital mixer according to claim 6, wherein one specific functional block among the plurality of functional blocks includes a plurality of sub functional blocks having respective versions, a version of a specific sub functional block of the plurality of sub functional blocks being set to the reference version, and said checking device checks matching of a version of the specific functional block exclusive of the specific sub functional block with the reference version, said display displaying results of the checking, the version of the specific functional block, and the reference version.

9. A digital mixer according to claim 8, wherein said checking device checks matching of the respective versions of the sub functional blocks other than the specific sub functional block with the reference version, and said display displays the versions of the sub functional blocks other than the specific sub functional block and respective results of the checking thereof.

10. A digital mixer according to claim 8, wherein functional blocks other than the specific functional block include a plurality of sub functional blocks having respective versions, and said checking device checks matching of respective versions of the functional blocks other than the specific functional block with the reference version, said display displaying the versions of the functional blocks other than the specific functional block and respective results of the checking thereof.

11. A digital mixer according to claim 10, wherein said checking device checks matching of the versions of the plurality of sub functional blocks included in the functional blocks other than the specific functional block with the reference version, and said display displays the respective versions of the sub functional blocks included in the functional blocks other than the specific functional block and respective results of the checking thereof.

12. A digital mixer according to claim 8, wherein said display displays a plurality of sub functional blocks connected to at least one input and at least one output of at least one functional block other than the specific functional block.

13. A digital mixer according to claim 12, wherein said checking device checks matching of respective versions of the sub functional blocks connected to the at least one input and the at least one output of the at least one functional block other than the specific functional block with the reference version, and said display displays the versions of the sub functional blocks connected to the at least one input and the at least one output of the at least one functional block other than the specific functional block, and results of the checking thereof.

14. A digital mixer according to claim 12, wherein the at least one input and the at least one output of the at least one functional block other than the specific functional block have a plurality of terminals, and said display displays respective connection states of the terminals.

15. A digital mixer that includes a plurality of functional blocks and operates as a mixer by cooperation of the plurality of functional blocks, wherein the functional blocks have CPU's and storage devices that store respective control programs executed by said CPU's, the digital mixer comprising:

an acquisition device that acquires versions of the control programs of the functional blocks when power of the digital mixer is turned on;

a checking device that checks matching of the acquired versions of the control programs with a reference version; and a controller that causes the digital mixer to continue operation thereof when the checked versions of the control programs all match the reference version, and causes a warning to be given to a user when at least one of the checked versions of the control programs mismatches the reference version.

16. A digital mixer according to claim 15, wherein a version of at least one of the control programs is set to a reference version for the control programs of the plurality of functional blocks.

17. A method of controlling a digital mixer that includes a plurality of functional blocks and operates as a mixer by cooperation of the plurality of functional blocks, wherein the functional blocks have respective versions, the method comprising:

an acquisition step of acquiring the versions of the functional blocks when power of the digital mixer is turned on;

a checking step of checking matching of the acquired versions of the functional blocks with a reference version; and a control step of causing the digital mixer to continue operation thereof when the checked versions of the functional blocks all match the reference version, and causing a warning to be given to a user when at least one of the checked versions of the functional blocks mismatches the reference version.

18. A method of controlling a digital mixer, according to claim 17, wherein a version of at least one of the plurality of functional blocks is set to a reference version for the plurality of functional blocks.

19. A method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks, the method comprising:
an acquisition step of acquiring the versions of the functional blocks when power of the digital mixer is turned on;
a detecting step of detecting whether or not at least one new functional block is connected to the plurality of functional blocks;
a checking step of checking matching of the acquired versions of the functional blocks and a version of the at least one functional block connection of which has been detected, with the reference version;
a determination step of determining, when at least one of the checked versions of the functional blocks mismatches the reference version, whether or not the mismatch is fatal to an overall operation of the digital mixer; and
a control step of (1) causing the digital mixer to transit to a normally operative state when the checked versions of the functional blocks all match the reference version, or (2) issuing an instruction for stopping operation of the functional blocks, displaying results of the checking in said checking step, the respective versions of the functional blocks, and a message that the mismatch is fatal to the overall operation of the digital mixer, and causing the digital mixer to transit to an inoperative state, when the mismatch is fatal to the overall operation of the digital mixer, or (3) issuing an instruction for stopping operation of a functional block that mismatches in version, and cutting off communication with the functional block, displaying results of the checking in said checking step, the versions of the functional blocks, and a message that operation will be continued by ignoring the mistake, and causing the digital mixer to transit to a partially operative state, when the mismatch is not fatal to the overall operation of the digital mixer.

20. A method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks,
the method comprising:
an acquisition step of acquiring the versions of the functional blocks when power of the digital mixer is turned on;
a version acquisition completion-determining step of determining whether or not acquisition of the versions of all the functional blocks has been completed;
a timeout-determining step of determining whether or not a predetermined time period has elapsed after version acquisition was started in said acquisition step;
an impossible version acquisition-determining step of determining, when it is determined in said timeout-determining step that the predetermined time period has elapsed, that a version of a functional block which could not be acquired in said acquisition step is unobtainable; and
a checking step of checking matching of the versions of the functional blocks acquired in said acquisition step with the reference version, when it is determined in said version acquisition completion-determining step that acquisition of the versions of all has been completed, or when it is determined in said timeout-determining step that the predetermined time period has elapsed.

21. A method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks,
the method comprising:
an acquisition step of acquiring, when at least one new functional block is connected to the plurality of functional blocks, a version of the at least one functional block connected to the plurality of functional blocks;
a checking step of checking matching of the acquired version of the at least one functional block connected to the plurality of functional blocks with the reference version;
an operation stop-instructing step of issuing, when the checked version of the at least one functional block mismatches the reference version, an instruction for stopping operation of the at least one functional block connected to the plurality of functional blocks; and
a display step of displaying the version of the at least one functional block connected to the plurality of functional blocks and results of the checking in said checking step.

22. A method of controlling a digital mixer, according to claim 21, comprising a communication cutoff-instructing step of issuing, when the checked version of the at least one functional block connected to the plurality of functional blocks mismatches the reference version, an instruction for cutting off communication with the at least one functional block connected to the plurality of functional blocks.

23. A method of controlling a digital mixer that includes a plurality of functional blocks and operates as a mixer by cooperation of the plurality of functional blocks, wherein the functional blocks have respective versions, and a version of at least one of the functional blocks is set to a reference version for the plurality of functional blocks, and wherein the digital mixer checks matching of the versions of the plurality of functional blocks with the reference version, and displays results of the checking in a dialog box,
the method comprising:
a notification step of notifying, when disconnection of at least one functional block from the plurality of functional blocks is detected, a user that the at least one functional block has been disconnected from the plurality of functional blocks;
a first update step of updating a status of the digital mixer according to a kind of the disconnected functional blocks;
a determination step of determining, when disconnection of at least one functional block from the plurality of functional blocks is detected, whether or not the dialog box is being displayed, or whether or not there is a version mismatch of at least one functional block of the plurality of function blocks;
a second update step of updating, when it is determined in said determination step that the dialog box is being displayed or that there is a version mismatch, display concerning the disconnected functional block in the dialog box; and
a control step of causing the digital mixer to transit to a normally operative state when there is no version mismatch after the update of the display concerning the disconnected functional block in the dialog box, or causing the digital mixer to transit to a partially operative state when there is a version mismatch of at least one functional block of the plurality of function blocks but operation of the digital mixer is possible, or causing the digital mixer to transit to an inoperative state when there is a version mismatch that is fatal to continued overall operation of the digital mixer.

* * * * *